United States Patent
Huang et al.

(10) Patent No.: US 11,902,960 B2
(45) Date of Patent: Feb. 13, 2024

(54) TIMER-BASED BEACON AND ECHO PROCEDURE

(71) Applicant: QUALCOMM Incorporated, San Diego, CA (US)

(72) Inventors: Yi Huang, San Diego, CA (US); Seyedkianoush Hosseini, San Diego, CA (US); Wei Yang, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/486,723

(22) Filed: Sep. 27, 2021

(65) Prior Publication Data

US 2022/0104220 A1 Mar. 31, 2022

Related U.S. Application Data

(60) Provisional application No. 63/084,521, filed on Sep. 28, 2020.

(51) Int. Cl.
*H04W 72/12* (2023.01)
*H04W 72/1263* (2023.01)
*H04W 48/16* (2009.01)

(52) U.S. Cl.
CPC ....... *H04W 72/1263* (2013.01); *H04W 48/16* (2013.01)

(58) Field of Classification Search
CPC ... H04W 72/1263; H04W 48/16; H04W 8/00; H04W 8/005; H04W 76/14; H04W 76/19; H04W 24/10; H04L 5/0057; H04L 5/0044; H04L 5/005
See application file for complete search history.

(56) References Cited

U.S. PATENT DOCUMENTS

| | | | |
|---|---|---|---|
| 2020/0367206 A1* | 11/2020 | Kim | H04W 72/04 |
| 2021/0051525 A1* | 2/2021 | Cao | H04W 72/02 |
| 2021/0136781 A1* | 5/2021 | Hosseini | H04W 72/23 |
| 2021/0212148 A1* | 7/2021 | Liang | H04L 5/0044 |

FOREIGN PATENT DOCUMENTS

| | | | | |
|---|---|---|---|---|
| WO | 2020063674 A1 | 4/2020 | | |
| WO | 2020065057 A1 | 4/2020 | | |
| WO | WO-2020063674 A1 * | 4/2020 | | H04L 43/0811 |
| WO | 2020167773 A1 | 8/2020 | | |

OTHER PUBLICATIONS

International Search Report and Written Opinion—PCT/US2021/052444—ISA/EPO—dated Jan. 18, 2022.

* cited by examiner

*Primary Examiner* — Mewale A Ambaye
(74) *Attorney, Agent, or Firm* — Loza & Loza, LLP

(57) ABSTRACT

The aspects described herein may avoid delays and may improve performance at a first apparatus when monitoring a periodic resource pool for an echo signal during a beacon and echo procedure with a second apparatus. The first apparatus transmits a beacon signal using one or more resources in a periodic resource pool, starts a timer, and monitors the periodic resource pool for an echo signal from the second apparatus until expiration of the timer.

27 Claims, 17 Drawing Sheets

1500

Select one or more parameter values for a beacon and echo procedure performed between first and second user equipment (UEs) using a periodic resource pool, the one or more parameter values including at least a time period for a timer implemented by the first UE when monitoring the periodic resource pool for an echo signal from the second UE ⟿1502

Transmit the one or more parameter values to at least the first and second UEs ⟿1504

FIG. 15

TIMER-BASED BEACON AND ECHO PROCEDURE

CROSS REFERENCE TO RELATED APPLICATION(S)

This application claims the benefit of U.S. Provisional Application Ser. No. 63/084,521, entitled "TIMER-BASED BEACON AND ECHO PROCEDURE" and filed on Sep. 28, 2020, which is expressly incorporated by reference herein in its entirety.

BACKGROUND

Technical Field

The present disclosure relates generally to communication systems, and more particularly, to a timer-based beacon and echo procedure.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A first user equipment (UE) may perform a beacon and echo procedure with a second UE to estimate a sidelink channel between the first UE and the second UE. The first UE may determine one or more transmission parameters (e.g., a resource block (RB) allocation, a modulation and coding scheme (MCS), a precoder to be applied, a rank, and/or other suitable transmission parameters) based on the estimation of the sidelink channel. The first UE may use the one or more transmission parameters to transmit sidelink data traffic to the second UE on the sidelink channel.

The first UE may initiate the beacon and echo procedure by transmitting a beacon signal using resources in a periodic resource pool and may begin monitoring the periodic resource pool to detect an echo signal from the second UE. The second UE may be configured to detect the beacon signal and to transmit the echo signal using one or more resources in the periodic resource pool in response to the beacon signal.

In some scenarios, an echo signal transmitted from the second UE may fail to arrive at the first UE (e.g., due to a physical obstruction, interference, etc.). In other scenarios, a second UE may not transit an echo signal in the first place (e.g., due to a failure to detect the beacon signal). As a result, after transmitting a beacon signal, the first UE may monitor the periodic resource pool for an echo signal for extended periods of time, which may delay completion of the beacon and echo procedure. This may delay transmission of the sidelink data traffic from the first UE and may impact a user experience. The aspects described herein may overcome these issues.

In an aspect of the disclosure, a method, a computer-readable medium, and an apparatus are provided. The apparatus may be a first apparatus (e.g., a first UE). The apparatus transmits a beacon signal using one or more resources in a periodic resource pool, starts a timer, and monitors the periodic resource pool for an echo signal from a second UE until expiration of the timer.

In an aspect of the disclosure, a first apparatus for wireless communication includes means for transmitting a beacon signal using one or more resources in a periodic resource pool, means for starting a timer, and means for monitoring the periodic resource pool for an echo signal from a second apparatus until expiration of the timer.

In an aspect of the disclosure, the first apparatus further includes means for determining whether the echo signal is detected in the periodic resource pool, means for incrementing a counter value after the expiration of the timer if the first apparatus was unable to detect the echo signal in the periodic resource pool; and means for retransmitting the beacon signal using the one or more resources in the periodic resource pool if the counter value is less than a counter threshold.

In an aspect of the disclosure, the first apparatus further includes means for restarting the timer when the beacon signal is retransmitted.

In an aspect of the disclosure, the first apparatus further includes means for incrementing a counter value after the expiration of the timer if the first apparatus was unable to detect the echo signal in the periodic resource pool; and means for determining that a sidelink channel is unavailable between the first apparatus and the second apparatus if the counter value is greater than or equal to a counter threshold.

In an aspect of the disclosure, the first apparatus further includes means for removing the second apparatus from a neighbor apparatus list when the sidelink channel is determined to be unavailable.

In an aspect of the disclosure, the first apparatus further includes means for performing a neighbor discovery procedure when the sidelink channel is determined to be unavailable and when a number of neighbor apparatuses in a neighbor apparatus list is less than a threshold, and means for updating the neighbor apparatus list based on the neighbor discovery procedure.

In an aspect of the disclosure, the first apparatus does not transmit any additional beacon signals when the timer is running.

In an aspect of the disclosure, the first apparatus further includes means for receiving a timer value from a base station, and means for adjusting the timer value received from the base station based on a sidelink channel quality between the first apparatus and the second apparatus.

In an aspect of the disclosure, a computer-readable medium storing computer executable code is provided. The code when executed by a processor cause the processor to transmit, from a first user equipment (UE), a beacon signal using one or more resources in a periodic resource pool, start a timer, and monitor the periodic resource pool for an echo signal from a second UE until expiration of the timer.

In an aspect of the disclosure, the code when executed by the processor further cause the processor to determine whether the echo signal is detected in the periodic resource pool, increment a counter value after the expiration of the timer if the first UE was unable to detect the echo signal in the periodic resource pool, and retransmit the beacon signal using the one or more resources in the periodic resource pool if the counter value is less than a counter threshold.

In an aspect of the disclosure, the code when executed by the processor further cause the processor to restart the timer when the beacon signal is retransmitted.

In an aspect of the disclosure, the code when executed by the processor further cause the processor to increment a counter value after the expiration of the timer if the first UE was unable to detect the echo signal in the periodic resource pool, and determine that a sidelink channel is unavailable between the first UE and the second UE if the counter value is greater than or equal to a counter threshold.

In an aspect of the disclosure, the code when executed by the processor further cause the processor to remove the second UE from a neighbor UE list when the sidelink channel is determined to be unavailable.

In an aspect of the disclosure, the code when executed by the processor further cause the processor to perform a neighbor discovery procedure when the sidelink channel is determined to be unavailable and when a number of neighbor UEs in a neighbor UE list is less than a threshold, and update the neighbor UE list based on the neighbor discovery procedure.

In an aspect of the disclosure, the code when executed by the processor further cause the processor to not transmit any additional beacon signals when the timer is running.

In an aspect of the disclosure, the code when executed by the processor further cause the processor to receive a timer value from a base station, and adjust the timer value received from the base station based on a sidelink channel quality between the first UE and the second UE.

In an aspect of the disclosure, a method, a computer-readable medium, and an apparatus are provided. The apparatus may be a first apparatus (e.g., a first UE). The apparatus transmits a beacon signal using one or more resources in a first periodic resource pool, starts a timer, and monitors at least one of the first periodic resource pool or a second periodic resource pool for an echo signal from a second apparatus until expiration of the timer.

In an aspect of the disclosure, the first apparatus determines whether the echo signal is detected in the first periodic resource pool or the second periodic resource pool, increments a counter value after the expiration of the timer if the first apparatus was unable to detect the echo signal in the first periodic resource pool or the second periodic resource pool, and retransmits the beacon signal using the one or more resources in the first periodic resource pool if the counter value is less than a counter threshold.

In an aspect of the disclosure, the first apparatus restarts the timer when the beacon signal is retransmitted.

In an aspect of the disclosure, the first apparatus increments a counter value after the expiration of the timer if the first apparatus was unable to detect the echo signal in the first periodic resource pool or the second periodic resource pool, and determines that a sidelink channel is unavailable between the first apparatus and the second apparatus if the counter value is greater than or equal to a counter threshold.

In an aspect of the disclosure, the first apparatus removes the second apparatus from a neighbor apparatus list when the sidelink channel is determined to be unavailable.

In an aspect of the disclosure, the first apparatus performs a neighbor discovery procedure when the sidelink channel is determined to be unavailable and when a number of neighbor apparatuses in a neighbor apparatus list is less than a threshold, and updates the neighbor apparatus list based on the neighbor discovery procedure.

In an aspect of the disclosure, the first apparatus does not transmit any additional beacon signals when the timer is running.

In an aspect of the disclosure, the first apparatus receives a timer value from a base station, and adjusts the timer value received from the base station based on a sidelink channel quality between the first apparatus and the second apparatus.

In an aspect of the disclosure, a first apparatus for wireless communication includes means for transmitting a beacon signal using one or more resources in a first periodic resource pool, means for starting a timer, and means for monitoring at least one of the first periodic resource pool or a second periodic resource pool for an echo signal from a second apparatus until expiration of the timer.

In an aspect of the disclosure, the first apparatus further includes means for determining whether the echo signal is detected in the first periodic resource pool or the second periodic resource pool, means for incrementing a counter value after the expiration of the timer if the first apparatus was unable to detect the echo signal in the first periodic resource pool or the second periodic resource pool, and means for retransmitting the beacon signal using the one or more resources in the first periodic resource pool if the counter value is less than a counter threshold.

In an aspect of the disclosure, the first apparatus further includes means for restarting the timer when the beacon signal is retransmitted.

In an aspect of the disclosure, the first apparatus further includes means for determining that a sidelink channel is unavailable between the first apparatus and the second apparatus if the counter value is greater than or equal to a counter threshold.

In an aspect of the disclosure, the first apparatus further includes means for removing the second apparatus from a neighbor apparatus list when the sidelink channel is determined to be unavailable.

In an aspect of the disclosure, the first apparatus further includes means for performing a neighbor discovery procedure when the sidelink channel is determined to be unavailable and when a number of neighbor apparatuses in a neighbor apparatus list is less than a threshold, and updates the neighbor apparatus list based on the neighbor discovery procedure.

In an aspect of the disclosure, the first apparatus further includes means for receiving a timer value from a base station, and means for adjusting the timer value received from the base station based on a sidelink channel quality between the first apparatus and the second apparatus.

In an aspect of the disclosure, a computer-readable medium storing computer executable code is provided. The code when executed by a processor cause the processor to transmit a beacon signal using one or more resources in a first periodic resource pool, start a timer, and monitor at least one of the first periodic resource pool or a second periodic resource pool for an echo signal from an apparatus until expiration of the timer.

In an aspect of the disclosure, the code when executed by the processor further cause the processor to determine whether the echo signal is detected in the first periodic resource pool or the second periodic resource pool, increment a counter value after the expiration of the timer if the first apparatus was unable to detect the echo signal in the first periodic resource pool or the second periodic resource pool, and retransmit the beacon signal using the one or more resources in the first periodic resource pool if the counter value is less than a counter threshold.

In an aspect of the disclosure, the code when executed by the processor further cause the processor to restart the timer when the beacon signal is retransmitted.

In an aspect of the disclosure, the code when executed by the processor further cause the processor to determine that a sidelink channel is unavailable between the first apparatus and the second apparatus if the counter value is greater than or equal to a counter threshold.

In an aspect of the disclosure, the code when executed by the processor further cause the processor remove the second apparatus from a neighbor apparatus list when the sidelink channel is determined to be unavailable.

In an aspect of the disclosure, the code when executed by the processor further cause the processor to perform a neighbor discovery procedure when the sidelink channel is determined to be unavailable and when a number of neighbor apparatuses in a neighbor apparatus list is less than a threshold, and update the neighbor apparatus list based on the neighbor discovery procedure.

In an aspect of the disclosure, the code when executed by the processor further cause the processor to receive a timer value from a base station, and adjust the timer value received from the base station based on a sidelink channel quality between the first apparatus and the second apparatus.

In an aspect of the disclosure, a method, a computer-readable medium, and an apparatus are provided. The apparatus may be a base station. The apparatus selects one or more parameter values for a beacon and echo procedure performed between first and second user equipments (UEs) using a periodic resource pool, the one or more parameter values including at least a time period for a timer implemented by the first UE when monitoring the periodic resource pool for an echo signal from the second UE, and transmits the one or more parameter values to at least the first and second UEs.

In an aspect of the disclosure, an apparatus for wireless communication includes means for selecting one or more parameter values for a beacon and echo procedure performed between first and second user equipments (UEs) using a periodic resource pool, the one or more parameter values including at least a time period for a timer implemented by the first UE when monitoring the periodic resource pool for an echo signal from the second UE, and means for transmitting the one or more parameter values to at least the first and second UEs.

In some aspects of the disclosure, the one or more parameter values further includes a counter threshold, wherein the counter threshold is applied by the first UE to control a number of beacon signal transmission attempts at the first UE.

In some aspects of the disclosure, the one or more parameter values further includes a neighbor UE list threshold representing a minimum number of neighbor UEs to be included in a neighbor UE list maintained at the first UE, wherein the neighbor UE list threshold is applied by the first UE when determining whether to perform a neighbor discovery procedure to update the neighbor UE list.

In an aspect of the disclosure, a computer-readable medium storing computer executable code is provided. The code when executed by a processor cause the processor to select one or more parameter values for a beacon and echo procedure performed between first and second user equipments (UEs) using a periodic resource pool, the one or more parameter values including at least a time period for a timer implemented by the first UE when monitoring the periodic resource pool for an echo signal from the second UE, and transmit the one or more parameter values to at least the first and second UEs.

In some aspects of the disclosure, the one or more parameter values further includes a counter threshold, wherein the counter threshold is applied by the first UE to control a number of beacon signal transmission attempts at the first UE.

In some aspects of the disclosure, the one or more parameter values further includes a neighbor UE list threshold representing a minimum number of neighbor UEs to be included in a neighbor UE list maintained at the first UE, wherein the neighbor UE list threshold is applied by the first UE when determining whether to perform a neighbor discovery procedure to update the neighbor UE list.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 15 is a flowchart of a method of wireless communication in accordance with various aspects of the disclosure.

DETAILED DESCRIPTION

Figure 1:
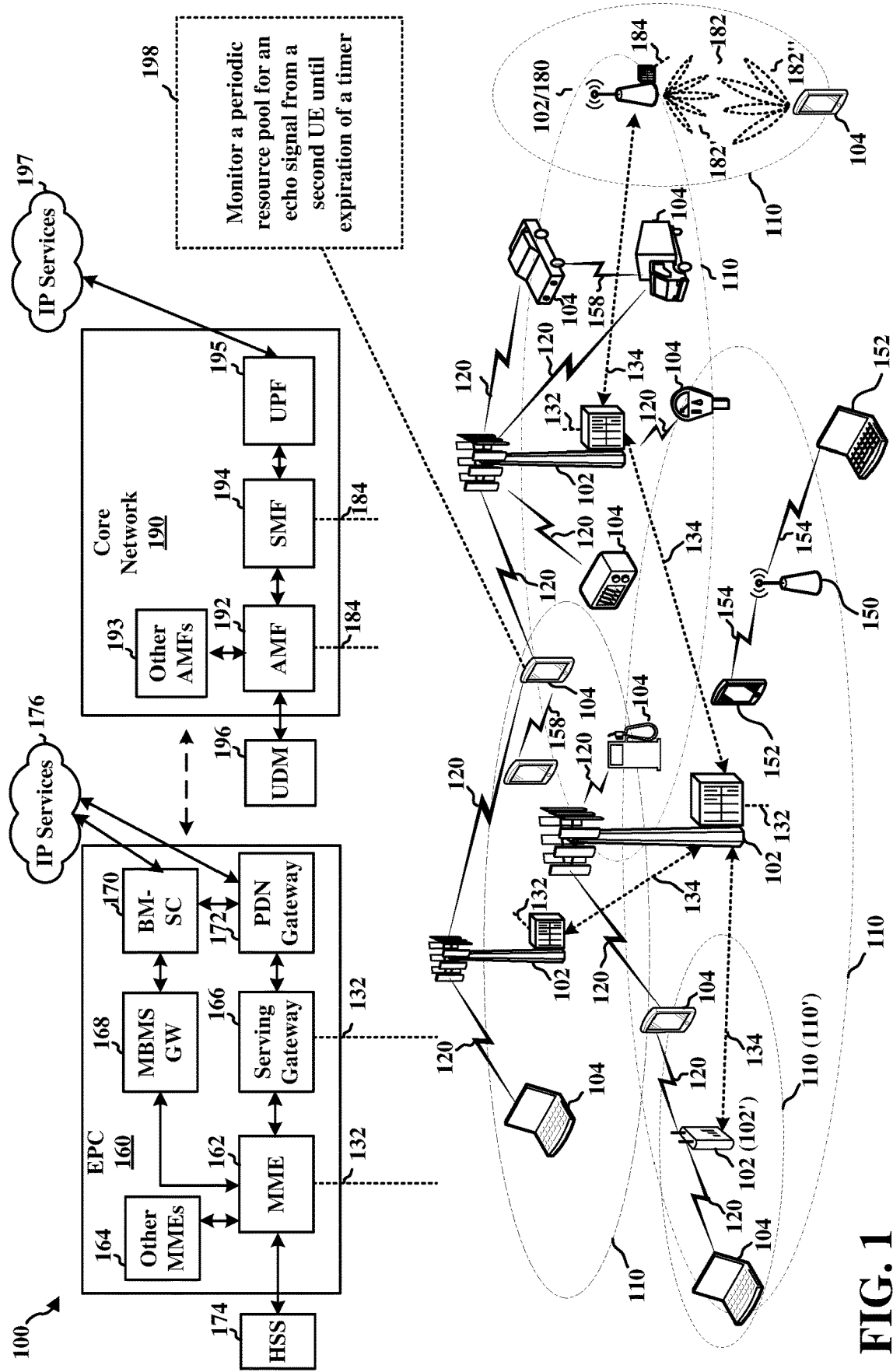
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE may be configured to monitor a periodic resource pool for an echo signal from a second UE until expiration of a timer 198. Although the following description may be focused on 5G NR, the concepts described herein may be applicable to other similar areas, such as LTE, LTE-A, CDMA, GSM, and other wireless technologies.

Figure 2:
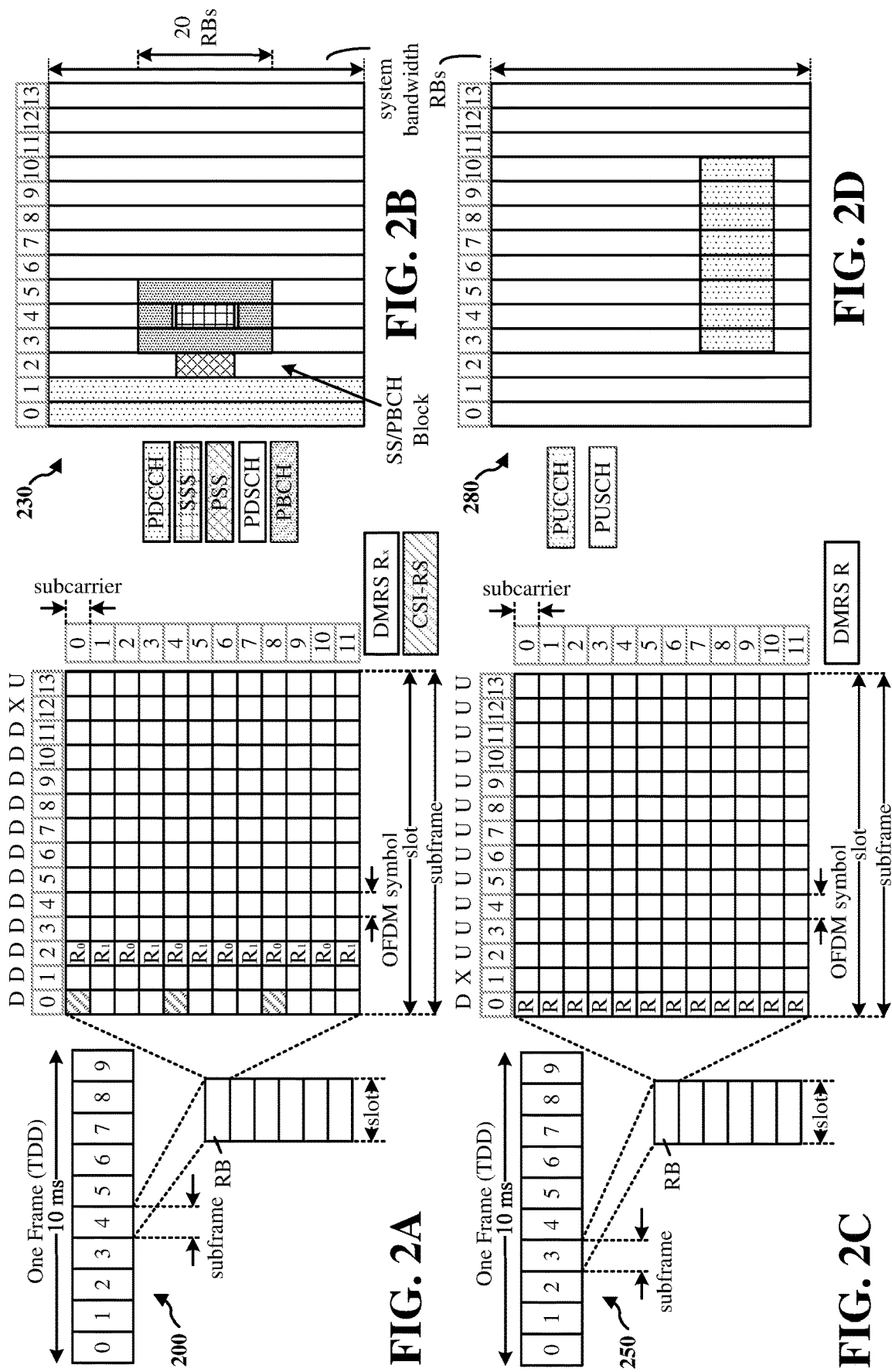
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
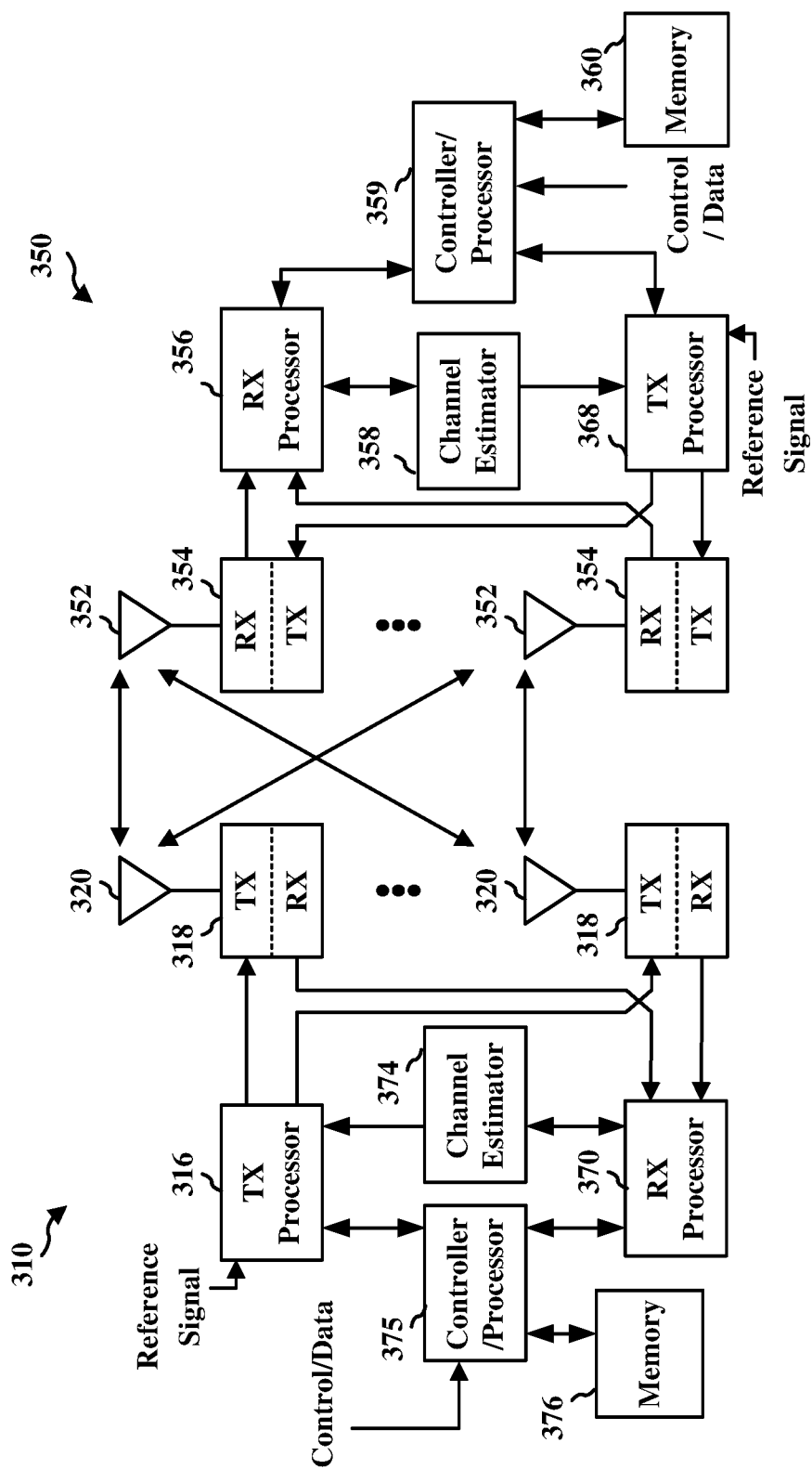
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
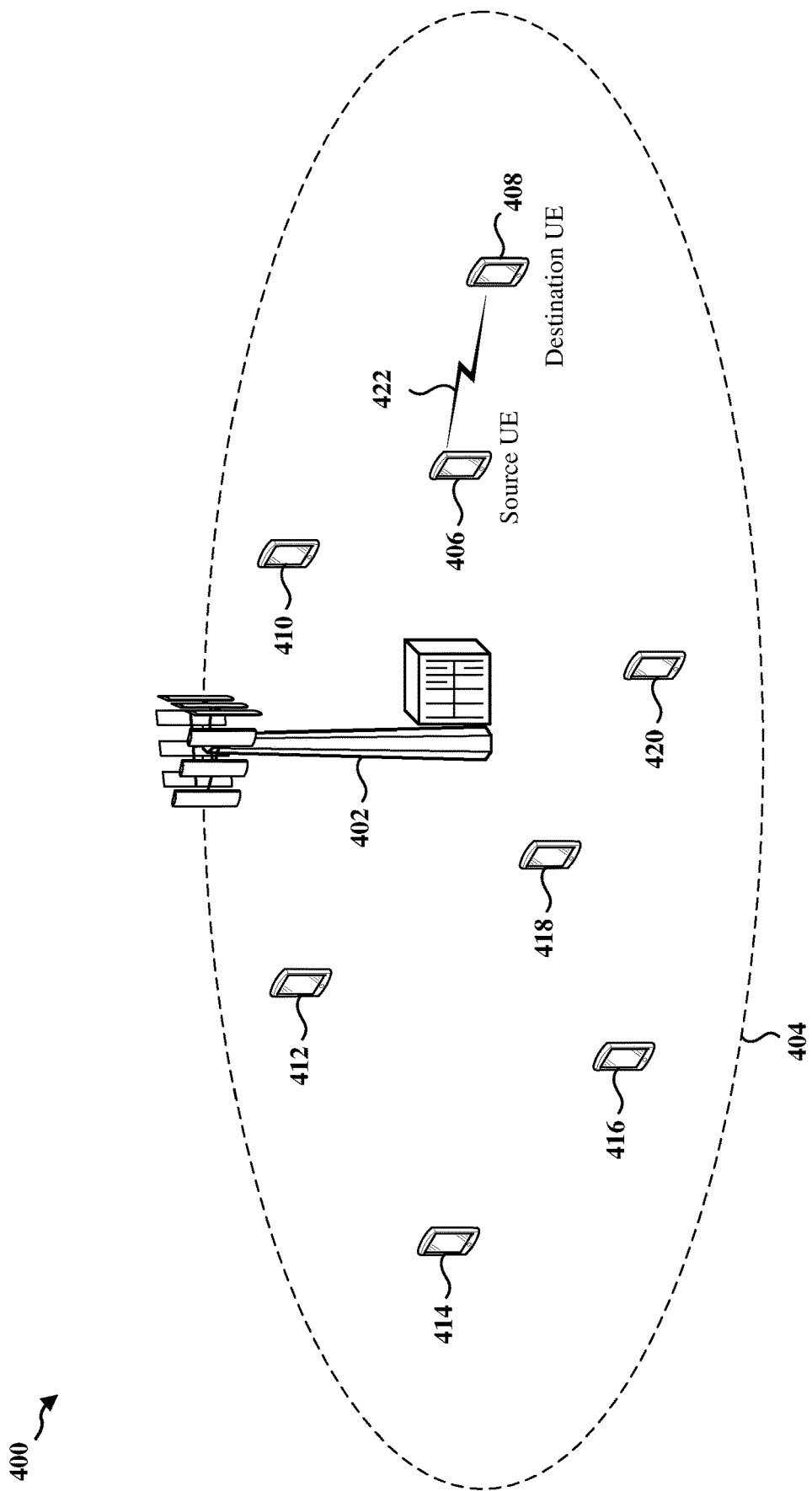
FIG. 4 illustrates a number of UEs capable of communicating with each other using device-to-device (D2D) communication links.

FIG. 4 illustrates a number of UEs (e.g., UEs 406, 408, 410, 412, 414, 416, 418, 420) capable of communicating with each other after establishing a device-to-device (D2D) communication link (e.g., D2D communication link 422) using a sidelink channel. As shown in FIG. 4, the UEs 406, 408, 410, 412, 414, 416, 418, 420 may be within a geographic coverage area 404 provided by a base station 402. The base station 402 may wirelessly communicate with the UEs 406, 408, 410, 412, 414, 416, 418, 420. Although the example in FIG. 4 includes eight UEs (e.g., the UEs 406, 408, 410, 412, 414, 416, 418, 420), it should be understood that a greater or lesser number of UEs may be possible in other examples.

In one example, the UE 406 may perform a discovery procedure to discover neighboring UEs (e.g., the UE 408) and may establish the D2D communication link 422 with the UE 408 using a sidelink channel. The UE 406 may then transmit sidelink data traffic to the UE 408 on the sidelink channel (e.g., a physical sidelink shared channel (PSSCH)). Therefore, in some examples, the UE 406 may be referred to as the source UE and the UE 408 may be referred to as the destination UE. In some examples, the D2D communication link 422 may be the same as the previously described D2D communication link 158.

The UEs 406, 408, 410, 412, 414, 416, 418, 420 may operate in a first sidelink resource allocation mode (also referred to as Mode 1) or a second sidelink resource allocation mode (also referred to as Mode 2). For example, when the UEs 406, 408 are operating in Mode 1, the base station 402 may schedule specific resources on the sidelink channel to be used by the UE 406 when transmitting sidelink data traffic to the UE 408. When the UEs 406, 408 are operating in Mode 2, however, the UE 406 may autonomously select from available resources in a resource pool on the sidelink channel. The resource pool may be previously configured by the base station 402.

In some examples, when the UEs 406, 408 are operating in Mode 2, the UE 406 may have data to transmit to the UE 408. However, to achieve successful transmission of the data to the UE 408 on a sidelink channel (e.g., PSSCH), the UE 406 may first need to determine a set of transmission parameters. In some examples, the set of transmission parameters may include, but may not be limited to, a resource block (RB) allocation, a modulation and coding scheme (MCS), a precoder to be applied, a rank, and/or other suitable transmission parameters.

In some examples, the UE 406 may determine the set of transmission parameters based on the properties of a radio channel (also referred to as channel state information) between the UE 406 and the UE 408. For example, the UE 406 may receive a reference signal from the UE 408 and may determine the channel state information based on one or more measurements of the reference signal from the UE 408. The UE 406 may use the channel state information to determine the set of transmission parameters. As described herein, the UE 406 may initiate a beacon and echo procedure to trigger an echo signal transmission from the UE 408 for purposes of determining the channel state information. For example, the echo signal may be a wideband reference signal (WB-RS) or other suitable reference signal that enables channel estimation. For example, a UE may initiate a beacon and echo procedure when the UE wakes up from a discontinuous reception (DRX) cycle, after performing a handover operation, or other scenario where the UE may have no information with respect to a sidelink channel between one or more other UEs. As described herein, a beacon and echo procedure may enable a UE to obtain the status (e.g., channel state information) of the sidelink channel.

Figure 5:
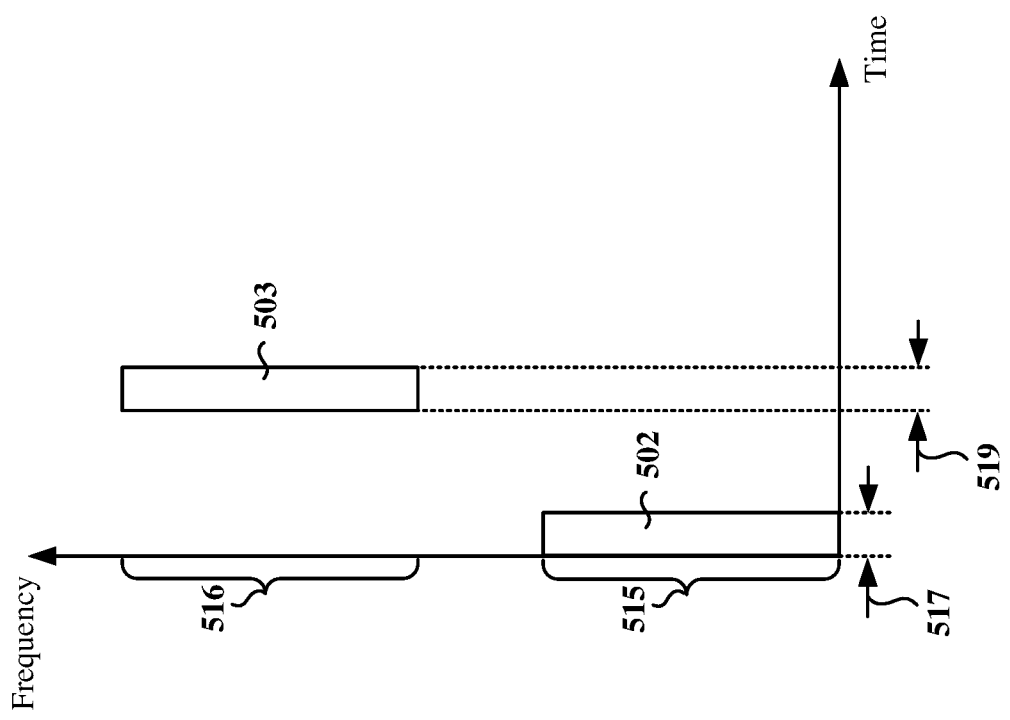
FIG. 5 illustrates an example of reference signal resource pool allocations for sidelink communications.

FIG. 5 illustrates an example of a reference signal resource pool allocation for sidelink communications. As shown in FIG. 5, a base station (e.g., the base station 402) may allocate a reference signal resource pool 502 that includes frequency domain resources 515 and time domain resources 517 (also referred to as time-frequency resources). The reference signal resource pool 502 may be referred to as a wideband reference signal (WB-RS) resource pool. The frequency domain resources 515 may include a range of frequencies that UEs may use for transmitting reference signals. The time domain resources 517 may indicate a period of time during which the frequency domain resources 515 may be used by the UEs. For example, the period of time may be the duration of one or more OFDM symbols. In some examples, the reference signal resource pool 502 may include time-frequency resources arranged as contiguous and/or non-contiguous resource blocks. Each of these resource blocks may represent a resource in the reference signal resource pool 502.

The reference signal resource pool 502 may be considered to be a UE transmission opportunity in terms of time and frequency. The reference signal resource pool 502 may be orthogonalized in the time domain using a TDM scheme and in the frequency domain using an FDM scheme. For example, a frequency range above the frequency domain resources 515, shown as frequency domain resources 516 in FIG. 5, may be used for a different reference signal resource pool 503. The time domain resources 519 may indicate a period of time during which the frequency domain resources 516 of the reference signal resource pool 503 may be used by the UEs. For example, the period of time may be the duration of one or more OFDM symbols. In the aspects described herein, the reference signal resource pool 502 may be referred to as a first reference signal resource pool and the reference signal resource pool 503 may be referred to as a second reference signal resource pool.

In some examples, the reference signal resource pool 502 may be a cell-specific reference signal resource pool. Therefore, UEs in a cell may share the reference signal resource pool 502 to transmit and receive reference signals. In some examples, and as described with reference to FIG. 6, the reference signal resource pool 502 may have a certain periodicity known to the UEs. For example, a base station may configure the periodicity of the reference signal resource pool 502 and may indicate the periodicity to the UEs.

In some examples, the reference signal resource pool 503 may have the same periodicity of the reference signal resource pool 502. In these examples, and as described in detail herein, the reference signal resource pool 503 may be offset from the reference signal resource pool 502 by an offset time (e.g., t). For example, a base station may configure the offset time and may indicate the offset time to the UEs.

A pair of UEs in a cell may perform a beacon and echo procedure using the periodically available reference signal resource pool 502. The beacon and echo procedure may enable a first UE to detect a reference signal (e.g., an echo signal) from a second UE and to perform channel estimation using the reference signal for purposes of determining transmission parameters for communicating with the second UE.

Figure 6:
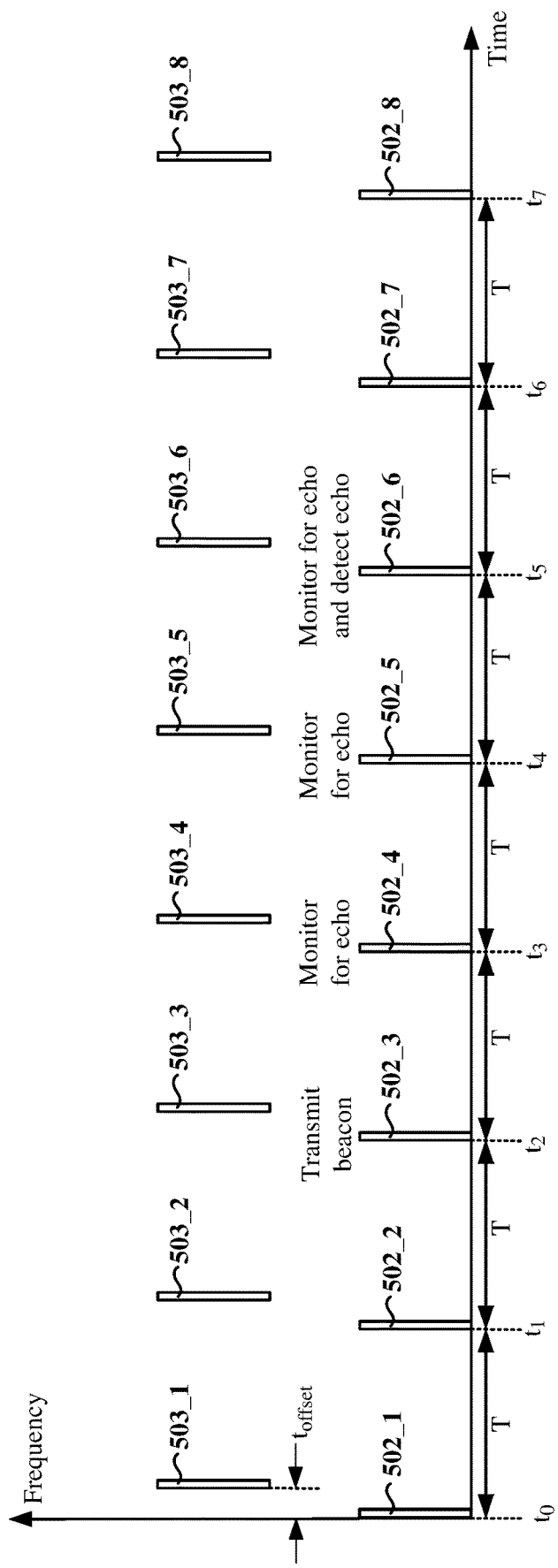
FIG. 6 is an exemplary diagram illustrating repetition of a first reference signal resource pool and a second reference signal resource pool with a period T.

FIG. 6 is an exemplary diagram illustrating repetition of the reference signal resource pool 502 with a period T. In FIG. 6, a first instance of the reference signal resource pool 502 is labeled with the reference numeral 502_1, a second instance of the reference signal resource pool 502 is labeled with the reference numeral 502_2, and so on up to the eighth instance of the reference signal resource pool 502 labeled with the reference numeral 502_8. In some examples, the period T may be two seconds. In other examples, the period T may be a duration that is less than two seconds or greater than two seconds. It should be noted that a reference signal resource pool (e.g., the reference signal resource pool 502) that repeats with a certain periodicity (e.g., the period T) as shown in FIG. 6 may be referred to as a periodic resource pool.

FIG. 6 further illustrates repetition of the reference signal resource pool 503 with a period T. In FIG. 6, a first instance of the reference signal resource pool 503 is labeled with the reference numeral 503_1, a second instance of the reference signal resource pool 503 is labeled with the reference numeral 503_2, and so on up to the eighth instance of the reference signal resource pool 503 labeled with the reference numeral 503_8. In the example of FIG. 6, the instances of the reference signal resource pool 503 are offset from the instances of the reference signal resource pool 502 by an offset time $t_{offset}$. The previously mentioned beacon and echo procedure will now be described with reference to FIGS. 6 and 7.

Figure 7:
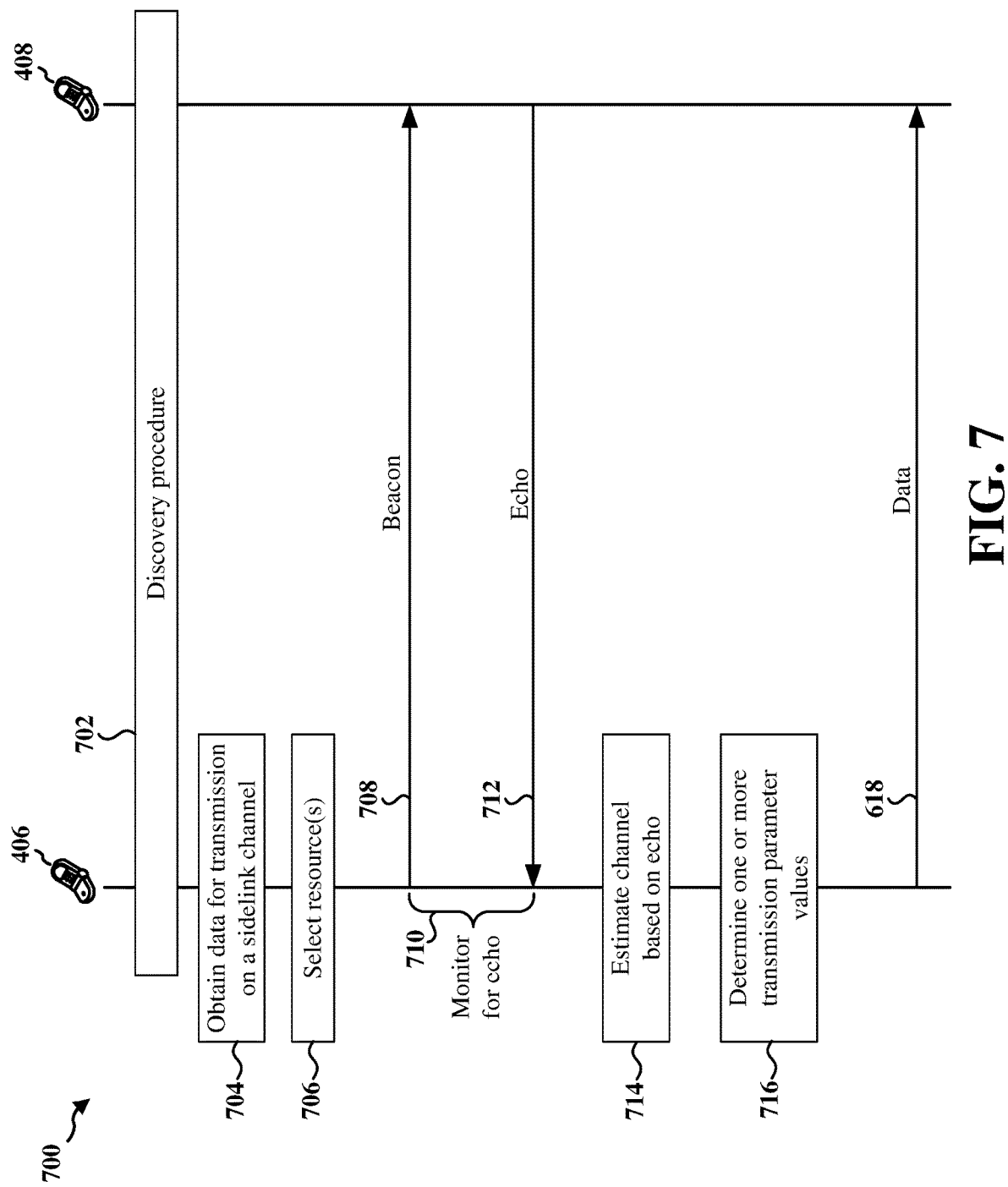
FIG. 7 is a signal flow diagram illustrating an example beacon and echo procedure performed by a pair of UEs.

FIG. 7 is a signal flow diagram 700 illustrating an example beacon and echo procedure performed by a pair of UEs 406, 408. At 702, a UE 406 may perform a discovery procedure with nearby UEs and may discover at least the UE 408. For example, the UE 406 may perform the discovery procedure by broadcasting a discovery signal during a discovery period. The discovery signal may include information identifying the UE 406 or a code that may be known to nearby UEs. The UE 406 may then detect a signal from one or more available UEs in response to the discovery signal. In some examples, UEs may not be able to perform data transmissions during the discovery period.

At 704, the UE 406 may obtain data (also referred to as sidelink data traffic) to be transmitted to the UE 408 on a sidelink channel. In some examples, a UE 406 may obtain the data by generating the data, receiving the data, and/or fetching the data. In one example, the UE 406 may generate the data at a processor of the UE 406. In this example, an application layer implemented in the processor of the UE 406 may cause the processor to output the data for transmission on a sidelink channel. In some examples, the data may include at least a portion of an image, a photo, a video, a text communication, and/or other types of information.

At 706, the UE 406 may select one or more resources to be used for transmission of a beacon signal. For example, with reference to FIG. 6, the UE 406 may randomly select one or more resources included in the third instance of the reference signal resource pool 502 (e.g., at 502_3). As previously described, in some examples, the reference signal resource pool 502 may include one or more resource blocks. In these examples, the UE 406 may randomly select one or more of the resource blocks in the reference signal resource pool 502.

The UE 406 may transmit a beacon signal 708 using the selected resource (e.g., at 502_3 as indicated in FIG. 6). In some aspects of the disclosure, the beacon signal may be a signal (e.g., a reference signal) that is directed to other UEs (e.g., the UE 408) proximate to the UE 406. For example, the beacon signal may be a signal directed to one or more UEs within the same cell as the UE 406.

In some examples, the UE 406 may generate a unique signature sequence (e.g., based on an identifier (ID) of the UE 406) and may include the unique signature sequence in the beacon signal 708. In some examples, the unique signature sequence may be used by a UE (e.g., the UE 408) to identify the UE 406. A UE (e.g., the UE 408) may be configured to consider a beacon signal (e.g., the beacon signal 708) from a UE (e.g., the UE 406) as a request from the UE to transmit on a sidelink channel.

At 710, the UE 406 may monitor one or more subsequent periodic instances of the reference signal resource pool 502 (e.g., at 502_4, 502_5, and 502_6 as indicated in FIG. 6) for an echo signal from the UE 408 or other neighboring UEs. The UE 406 may monitor subsequent periodic instances of the reference signal resource pool 502 by measuring the subsequent periodic instances of the reference signal resource pool 502. As shown in FIG. 7, if the UE 408 is not presently transmitting and successfully receives the beacon signal 708 (e.g., detects the beacon signal 708 in the reference signal resource pool 502), the UE 408 may transmit an echo signal 712 in response to receiving the beacon signal 708.

In some examples, the UE 408 may select a resource to be used for transmission of the echo signal 712. For example, with reference to FIG. 6, the UE 408 may randomly select a resource included in the sixth instance of the reference signal resource pool 502 (e.g., at 502_6) and may transmit the echo signal 712 using the selected resource. In some examples, the UE 408 may generate a unique signature sequence (e.g., based on an identifier (ID) of the UE 408) and may include the unique signature sequence in the echo signal 712. In some examples, the unique signature sequence may be used by the UE 406 to identify the UE 408 as the transmitter of the echo signal 712.

Since, at 710, the UE 406 continues to monitor one or more subsequent periodic instances of the reference signal resource pool 502 (e.g., at 502_4, 502_5, and 502_6 as indicated in FIG. 6) after transmitting the beacon signal 708, the UE 406 may detect the echo signal from the UE 408. For example, the UE 406 may detect the echo signal 712 in the sixth instance of the reference signal resource pool 502 (e.g., at 502_6).

At 714, the UE 406 may measure the echo signal 712 to estimate the sidelink channel between the UE 406 and the UE 408. In some examples, the UE 406 may estimate the sidelink channel by determining channel state information for the sidelink channel based on one or more measurements of the echo signal 712. Assuming channel reciprocity between the UE 406 and the UE 408, the UE 406 at 716 may use the channel state information to determine one or more transmission parameter values (e.g., a resource block (RB) allocation, a modulation and coding scheme (MCS), a precoder to be applied, a rank, and/or other suitable transmission parameters) to be used for transmission of the data to the UE 408 on the sidelink channel. The UE 406 may transmit the data 618 (e.g., the data obtained at 704) to the UE 408 on the sidelink channel (e.g., a physical sidelink shared channel (PSSCH)).

Figure 8:
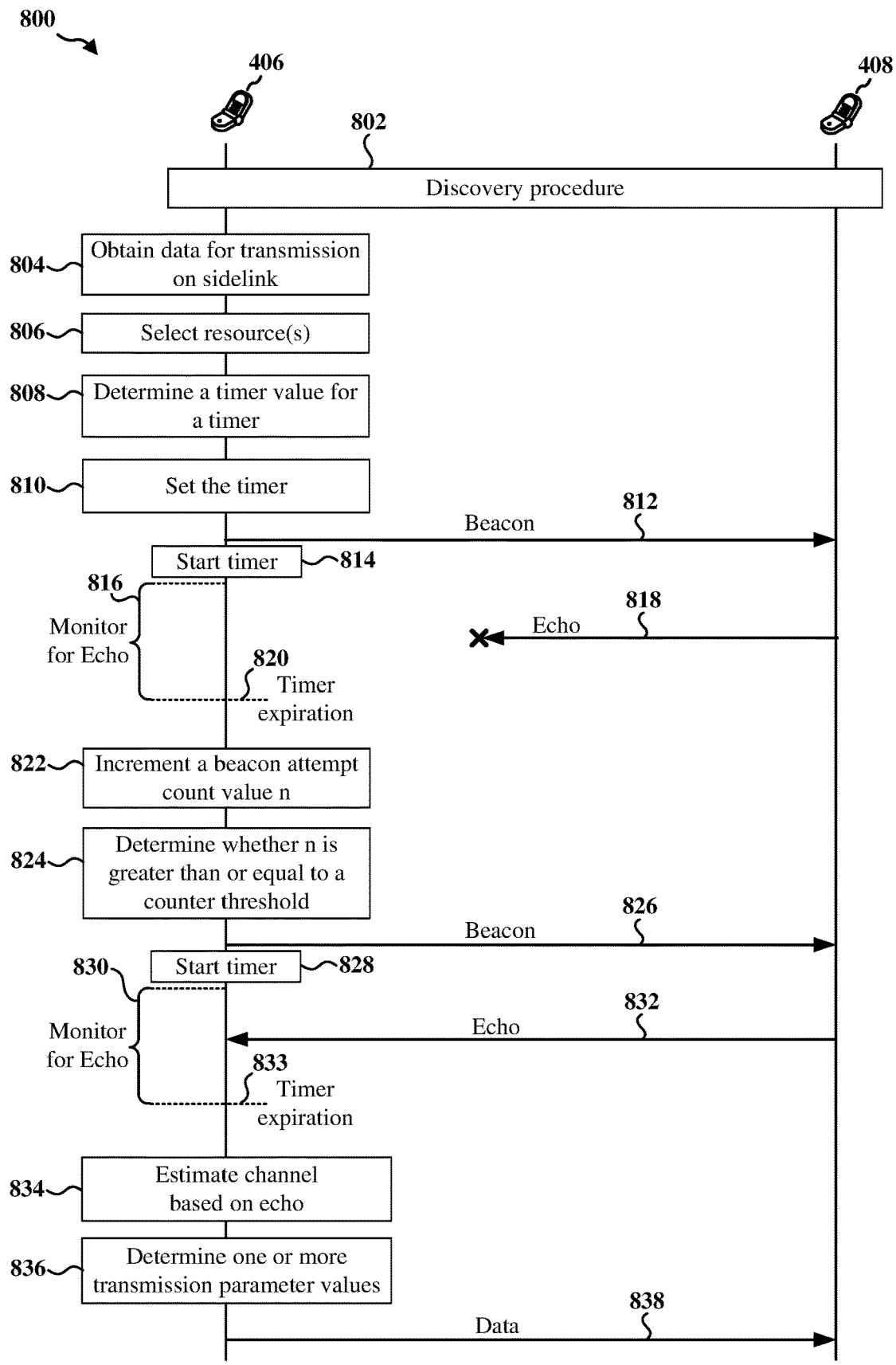
FIG. 8 is a signal flow diagram illustrating an example beacon and echo procedure performed by a pair of UEs in accordance with various aspects of the present disclosure.

FIG. 8 is a signal flow diagram 800 illustrating an example timer-based beacon and echo procedure performed by a pair of UEs 406, 408 in accordance with various aspects of the present disclosure. As shown in FIG. 8, the UE 406 may perform a discovery procedure 802 with nearby UEs and may discover at least the UE 408. In some examples, the UE 406 may generate a neighbor UE list and may include one or more of the discovered UEs in the neighbor UE list. For example, the UE 406 may include at least the UE 408 in the neighbor UE list.

At 804, the UE 406 may obtain data (also referred to as sidelink data traffic) to be transmitted to the UE 408 on a sidelink channel. In some examples, a UE 406 may obtain the data by generating the data, receiving the data, and/or fetching the data. In one example, the UE 406 may generate the data at a processor of the UE 406. In this example, an application layer implemented in the processor of the UE 406 may cause the processor to output the data for transmission on a sidelink channel. In some examples, the data may include at least a portion of an image, a photo, a video, a text communication, and/or other types of information.

Figure 9:
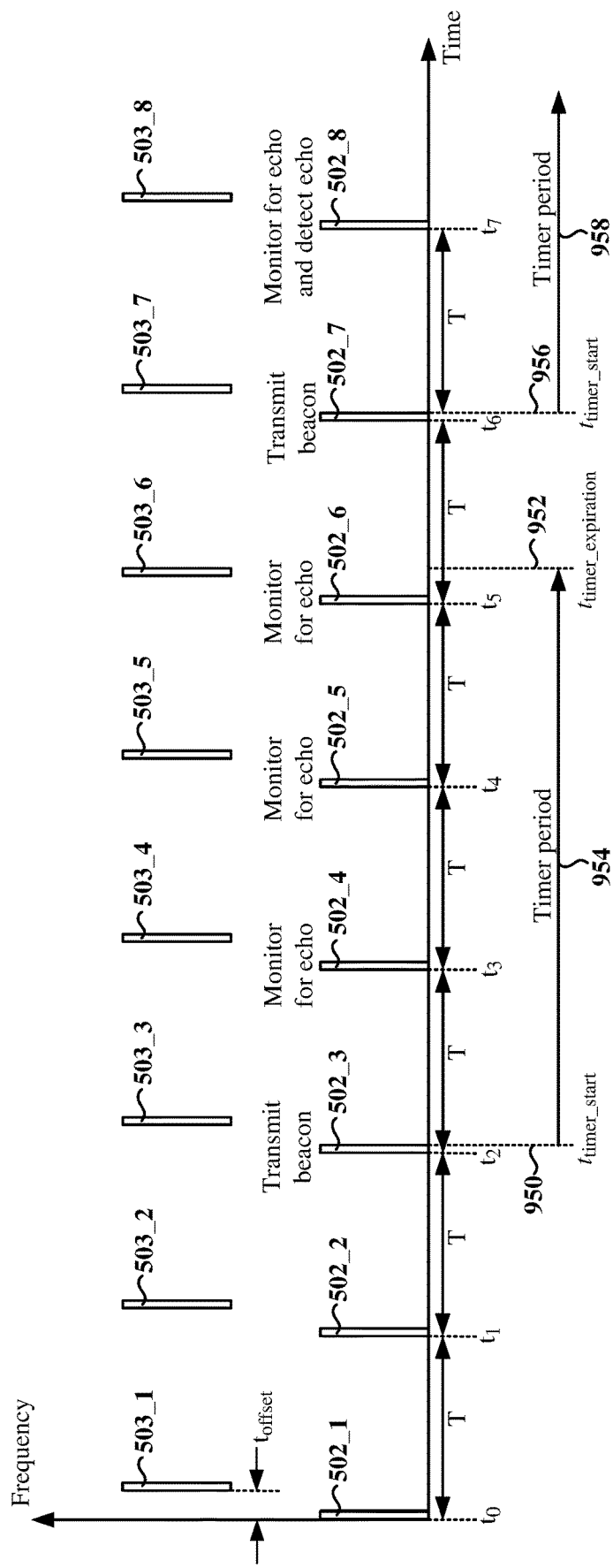
FIG. 9 is an exemplary diagram illustrating repetition of the first reference signal resource pool and the second reference signal resource pool with a period T.

At 806, the UE 406 may select one or more resources to be used for transmission of a beacon signal. FIG. 9 is an exemplary diagram illustrating repetition of the first reference signal resource pool 502 and the second reference signal resource pool 503 with a period T as previously described with reference to FIG. 6. In one example, the UE 406 may randomly select one or more resources included in the third instance of the reference signal resource pool 502 (e.g., at 502_3). It should be understood that, in other examples, the UE 406 may randomly select one or more resources included in a different instance of the reference signal resource pool 502. As previously described, in some examples, the reference signal resource pool 502 may include one or more resource blocks. In these examples, the UE 406 may randomly select one or more of the resource blocks in an instance of the reference signal resource pool 502.

At 808, the UE 406 may determine a timer value (e.g., a time period) for a timer. In some aspects of the disclosure, the UE 406 may determine the timer value based on a timer value received from the base station 402. In some examples, the UE 406 may adjust the timer value received from the base station based on a sidelink channel quality between the UE 406 and the UE 408. For example, if the sidelink channel quality is high (e.g., greater than a quality threshold), the UE 406 may reduce the timer value by a first percentage (e.g., 50%). However, if the sidelink channel quality is low (e.g., less than or equal to the quality threshold), the UE 406 may increase the timer value by a second percentage (e.g., 25%). In some examples, the first and second percentages may be the same. For example, the UE 406 may determine the sidelink channel quality between the UE 406 and the UE 408 during the discovery procedure 802.

At 810, the UE 406 may set the timer to the determined timer value (e.g., the timer value determined at 808). For example, if the timer value determined at 808 is two seconds, the UE 406 may set the timer to two seconds.

The UE 406 may transmit a beacon signal 812 using the selected resource (e.g., at 502_3 as indicated in FIG. 9). In some examples, the UE 406 may generate a unique signature sequence (e.g., based on an identifier (ID) of the UE 406) and may include the unique signature sequence in the beacon signal 812. In some examples, the unique signature sequence may be used by a UE (e.g., the UE 408) to identify the UE 406 as the transmitter of the beacon signal 812.

At 814, the UE 406 may start the timer and may monitor 816 one or more subsequent periodic instances of the reference signal resource pool 502 (e.g., at 502_4, 502_5, and 502_6 as indicated in FIG. 9) for an echo signal from the UE 408 or other neighboring UEs. As shown in FIG. 9, for example, the timer may start at time $t_{timer\_start}$ 950. In some aspects of the disclosure, the UE 406 does not transmit any additional beacon signals when the timer is running (e.g., during the timer period 954 in FIG. 9).

At 816, the UE 406 may monitor subsequent periodic instances of the reference signal resource pool 502 by measuring the subsequent periodic instances of the reference signal resource pool 502. As shown in FIG. 8, if the UE 408 is not presently transmitting and successfully receives the beacon signal 812, the UE 408 may transmit an echo signal 818 in response to receiving the beacon signal 812.

In some scenarios, and as shown in FIG. 8, the UE 406 may not receive the echo signal 818 (e.g., due to interference, physical obstructions, and/or other reasons) transmitted from the UE 408. In other scenarios, although not shown in FIG. 8, the UE 408 may not transmit the echo signal 818 in the first place (e.g., due to a failure to receive the beacon signal 810). As shown in FIG. 8, if the UE 406 does not receive an echo signal from the UE 408 prior to expiration of the timer (e.g., prior to the timer expiration at 820 in FIG. 8), the UE 406 may be configured to no longer monitor the subsequent periodic instances of the reference signal resource pool 502. With reference to FIG. 9, for example, the timer may expire at time $t_{timer\_expiration}$ 952.

At 822, the UE 406 may increment a beacon attempt counter value n by one (e.g., n=n+1) and at 824, the UE 406 may determine whether n is greater than or equal to a counter threshold. If the beacon attempt counter value n is not greater than or equal to the counter threshold, the UE 406 may transmit another beacon signal 826. In some examples, the beacon signal 826 may be configured the same as the beacon signal 812.

If the beacon attempt counter value n is greater than or equal to the counter threshold, the UE 406 may determine that a sidelink channel is unavailable between the UE 406 and the UE 408. In other words, the UE 406 may declare that the link or association between the UE 406 and the UE 408 is broken. In some examples, when the UE 406 determines that a sidelink channel is unavailable between the UE 406 and the UE 408, the UE 406 may either remove the UE 408 from a neighbor UE list maintained at the UE 406, or may restart a neighbor UE discovery procedure (e.g., the discovery procedure 802) to update the neighbor UE list. In some examples, the UE 406 may restart the neighbor UE discovery procedure to update the neighbor UE list if the number of neighboring UEs in the neighbor UE list is less than a threshold. The threshold may be configured by the base station 402.

At 828, the UE 406 may restart the timer. At 830, the UE 406 may monitor one or more subsequent periodic instances of the reference signal resource pool 502 (e.g., at 502_8 as indicated in FIG. 9) for an echo signal from the UE 408 or other neighboring UEs. As shown in FIG. 9, if the UE 408 is not presently transmitting and successfully receives the beacon signal 826, the UE 408 may transmit an echo signal 832 in response to receiving the beacon signal 826.

In some examples, the UE 408 may select a resource to be used for transmission of the echo signal 832. For example, with reference to FIG. 9, the UE 408 may randomly select a resource included in the eighth instance of the reference signal resource pool 502 (e.g., at 502_8) and may transmit the echo signal 832 using the selected resource. In some examples, the echo signal 832 may be configured the same as the echo signal 818.

The UE 406 may continue to monitor 830 subsequent periodic instances of the reference signal resource pool 502 (e.g., at 502_8) after transmitting the beacon signal 826 until expiration of the timer at 833 (or until reception of the echo signal 832 prior to expiration of the timer at 833). As shown in FIG. 8, the UE 406 may receive the echo signal 832 prior to expiration of the timer at 833. For example, with reference to FIG. 9, the UE 406 may detect the echo signal 832 in the eighth instance of the reference signal resource pool 502 (e.g., at 502_8). As shown in FIG. 9, the UE 406 may detect the echo signal 832 during the timer period 958 (e.g., prior to an end of the timer period 958). As shown in FIG. 9, for example, the timer period 958 may start at time $t_{timer\_start}$ 956.

At 834, the UE 406 may measure the echo signal 832 to estimate the sidelink channel between the UE 406 and the UE 408. In some examples, the UE 406 may estimate the sidelink channel by determining channel state information for the sidelink channel based on one or more measurements of the echo signal 832. Assuming channel reciprocity between the UE 406 and the UE 408, the UE 406 at 836 may use the channel state information to determine one or more transmission parameter values to be used for transmission of the data to the UE 408 on the sidelink channel. The UE 406 may transmit the data 838 (e.g., the data obtained at block 804) to the UE 408 on a sidelink channel (e.g., PSSCH).

Figure 10:
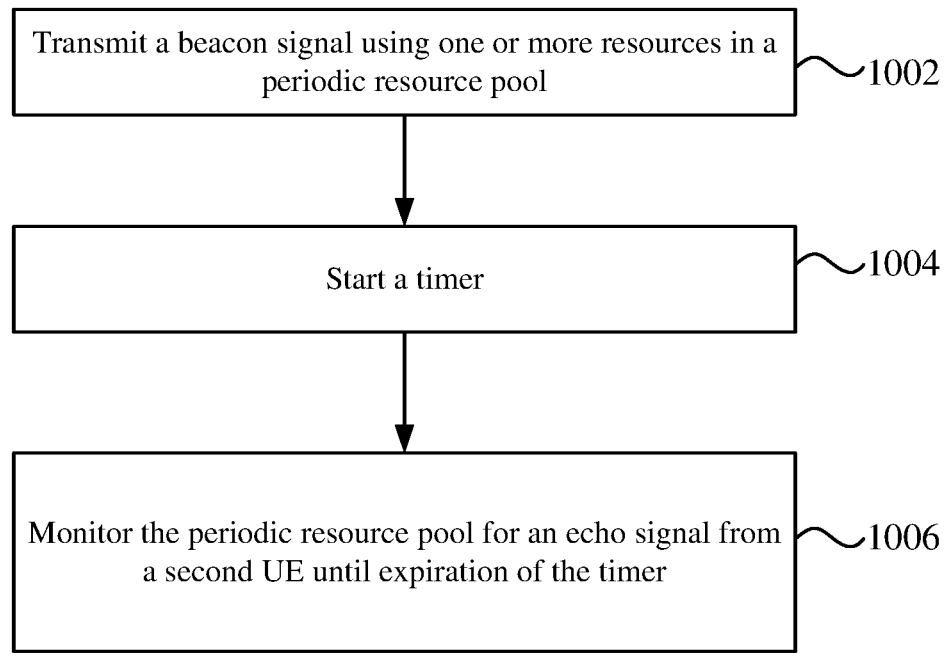
FIG. 10 is a flowchart of a method of wireless communication in accordance with various aspects of the disclosure.

FIG. 10 is a flowchart 1000 of a method of wireless communication in accordance with various aspects of the disclosure. The method may be performed by a first UE (e.g., the UE 406; the apparatus 1302/1302'; the processing system 1414, which may include the memory 360 and which may be the entire UE 406 or a component of the UE 406, such as the TX processor 368, the RX processor 356, and/or the controller/processor 359).

At 1002, the first UE transmits a beacon signal using one or more resources in a periodic resource pool. For example, with reference to FIG. 8, the first UE (e.g., the UE 406) may select one or more resources in an instance of the reference signal resource pool 502 for transmission of the beacon signal 812. In one example, the first UE may randomly select one or more resource blocks in the third instance of the reference signal resource pool 502 (e.g., at 502_3). The first UE may transmit the beacon signal 812 using the selected one or more resources in the instance of the reference signal resource pool 502.

At 1004, the first UE starts a timer. For example, with reference to FIG. 8, the first UE (e.g., the UE 406) at 808 may determine a timer value for a timer implemented at the first UE. In one example, the timer value may be a period of time, such as two seconds. At 814, the first UE (e.g., the UE 406) may start the timer based on the timer value. In some examples, the first UE may start the timer upon transmission of the beacon signal 812.

Finally, at 1006, the first UE monitors the periodic resource pool for an echo signal from a second UE until expiration of the timer. For example, with reference to FIG. 8, the first UE (e.g., the UE 406) may monitor 816 one or more periodic instances of the reference signal resource pool 502. In one example, with reference to FIG. 9, if the first UE transmits the beacon signal 812 using one or more resources in the third instance of the reference signal resource pool 502 (e.g., at 502_3), the first UE may monitor the subsequent instances of the reference signal resource pool 502 at 502_4, 502_5, and 502_6 for an echo signal from the second UE or other neighboring UEs. For example, the first UE may monitor the reference signal resource pool 502 by measuring one or more periodic instances of the reference signal resource pool 502 to detect an echo signal from the second UE. In some examples, the first UE may no longer monitor the reference signal resource pool 502 when the timer expires.

Figure 11:
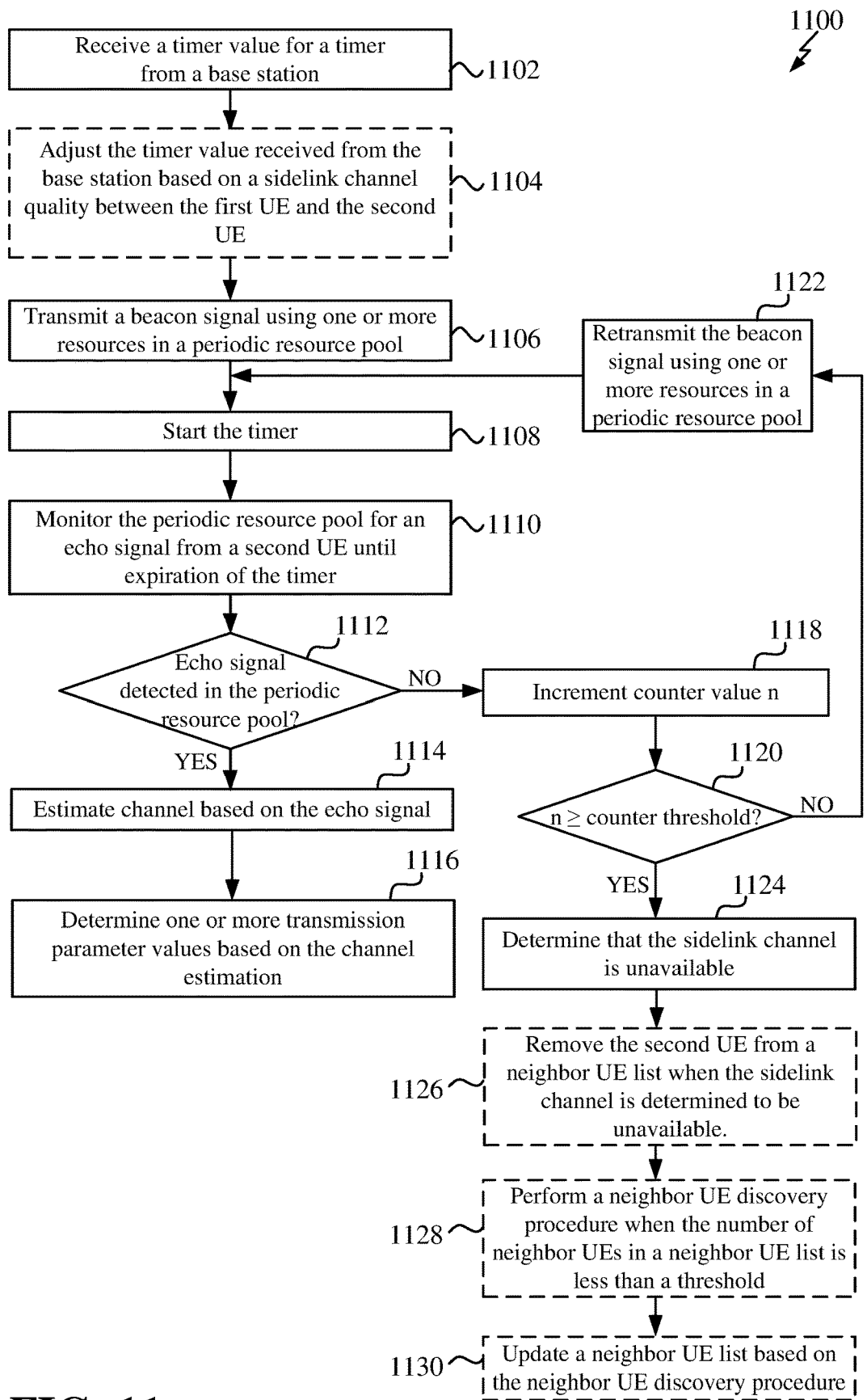
FIG. 11 is a flowchart of a method of wireless communication in accordance with various aspects of the disclosure.

FIG. 11 is a flowchart 1100 of a method of wireless communication. The method may be performed by a first UE (e.g., the UE 406; the apparatus 1302/1302'; the processing system 1414, which may include the memory 360 and which may be the entire UE 406 or a component of the UE 406, such as the TX processor 368, the RX processor 356, and/or the controller/processor 359). It should be understood that operations indicated with dashed lines in FIG. 11 represent optional operations.

At 1102, the first UE receives a timer value from a base station (e.g., the base station 402). In one example, the timer value may be a period of time, such as two seconds.

At 1104, the first UE optionally adjusts the timer value received from the base station based on a sidelink channel quality between the first UE (e.g., the UE 406) and the second UE (e.g., the UE 408). For example, the sidelink channel quality may be determined based on a signal strength measurement (e.g., a reference signal received power (RSRP)) of a reference signal or other suitable metric. In one example, if the sidelink channel quality is high (e.g., greater than a quality threshold), the UE 406 may reduce the timer value by a first percentage (e.g., 50%). In another example, if the sidelink channel quality is low (e.g., less than or equal to the quality threshold), the UE 406 may increase the timer value by a second percentage (e.g., 25%). In some examples, the first and second percentages may be the same. For example, the UE 406 may determine the sidelink channel quality between the UE 406 and the UE 408 during the discovery procedure 802.

At 1106, the first UE transmits a beacon signal using one or more resources in a periodic resource pool. For example, with reference to FIG. 6, the first UE may select one or more resources to be used for transmission of a beacon signal from an instance of the reference signal resource pool 502. For example, the first UE may randomly select one or more resources included in the third instance of the reference signal resource pool 502 (e.g., at 502_3). As previously described, in some examples, the reference signal resource pool 502 may include one or more resource blocks. In these examples, the UE 406 may randomly select one or more of the resource blocks in the reference signal resource pool 502. The first UE may transmit a beacon signal, such as the beacon signal 812 in FIG. 8, using the selected one or more resources from an instance of the reference signal resource pool 502.

At 1108, the first UE starts the timer (e.g., at 814 in FIG. 8). For example, the first UE (e.g., the UE 406) may start the timer based on the timer value. In some examples, the first UE may start the timer upon transmission of the beacon signal 812.

At 1110, the first UE monitors the periodic resource pool for an echo signal from a second UE (e.g., the UE 408) until expiration of the timer. For example, with reference to FIG. 8, the first UE (e.g., the UE 406) may monitor 816 one or more periodic instances of the reference signal resource pool 502. In one example, with reference to FIG. 9, if the first UE transmits the beacon signal 812 using one or more resources in the third instance of the reference signal resource pool 502 (e.g., at 502_3), the first UE may monitor the subsequent instances of the reference signal resource pool 502 at 502_4, 502_5, and 502_6 for an echo signal from the second UE (e.g., the UE 408) or other neighboring UEs. For example, the first UE may monitor the reference signal resource pool 502 by measuring one or more periodic instances of the reference signal resource pool 502 to detect an echo signal from the second UE. In some examples, the first UE may stop monitoring the reference signal resource pool 502 when the timer expires.

At 1112, the first UE determines whether the echo signal is detected in the periodic resource pool. For example, the first UE may detect the echo signal (e.g., a reference signal) in the periodic resource pool if the first UE measures a signal strength above a detection threshold in an instance of the reference signal resource pool 502. In one example, the first UE may measure a reference signal received power (RSRP) of an echo signal in an instance of the reference signal resource pool 502. For example, the first UE may not detect the echo signal in the periodic resource pool if the first UE measures a signal strength less than or equal to the detection threshold in an instance of the reference signal resource pool 502.

At 1114, the first UE estimates a sidelink channel (e.g., between the UE 406 and the UE 408) based on the echo signal. In one example, the echo signal may be a reference signal and the first UE may estimate a sidelink channel quality between the first UE and the second UE based on a signal strength measurement (e.g., a reference signal received power (RSRP)) of the reference signal. In other examples, a metric other than a signal strength measurement of the echo signal may be used to estimate the sidelink channel quality. In some examples, higher measured signal strengths of the echo signal may be associated with higher sidelink channel quality, while lower measured signal strengths of the echo signal may be associated with lower sidelink channel quality.

At 1116, the first UE determines one or more transmission parameter values based on the channel estimation. For example, the one or more transmission parameter values may include a resource block (RB) allocation, a modulation and coding scheme (MCS), a precoder to be applied, a rank, and/or other suitable transmission parameters.

At 1118, the first UE increments a counter value n (also referred to as a beacon attempt count value n) after the expiration of the timer if the first UE was unable to detect the echo signal in the periodic resource pool. At 1120, the first UE determines whether the counter value n is greater than or equal to a counter threshold.

At 1122, the first UE retransmits the beacon signal (e.g., the beacon signal 826 in FIG. 8) using the one or more resources in the periodic resource pool if the counter value is less than the counter threshold. The first UE may restart the timer (e.g., at 1108) when the beacon signal is retransmitted (e.g., at 1122).

At 1124, the first UE determines that a sidelink channel is unavailable between the first UE and the second UE if the counter value n is greater than or equal to the counter threshold. At 1126, the first UE optionally removes the second UE from a neighbor UE list when the sidelink channel is determined to be unavailable. At 1128, the first UE optionally performs a neighbor discovery procedure when the sidelink channel is determined to be unavailable and when a number of neighbor UEs in a neighbor UE list is less than a threshold.

Finally, at 1130, the first UE optionally updates the neighbor UE list based on the neighbor discovery procedure. For example, the first UE may update the neighbor UE list by adding one or more newly discovered UEs to the neighbor UE list and/or by removing one or more UEs from the neighbor UE list.

Figure 12:
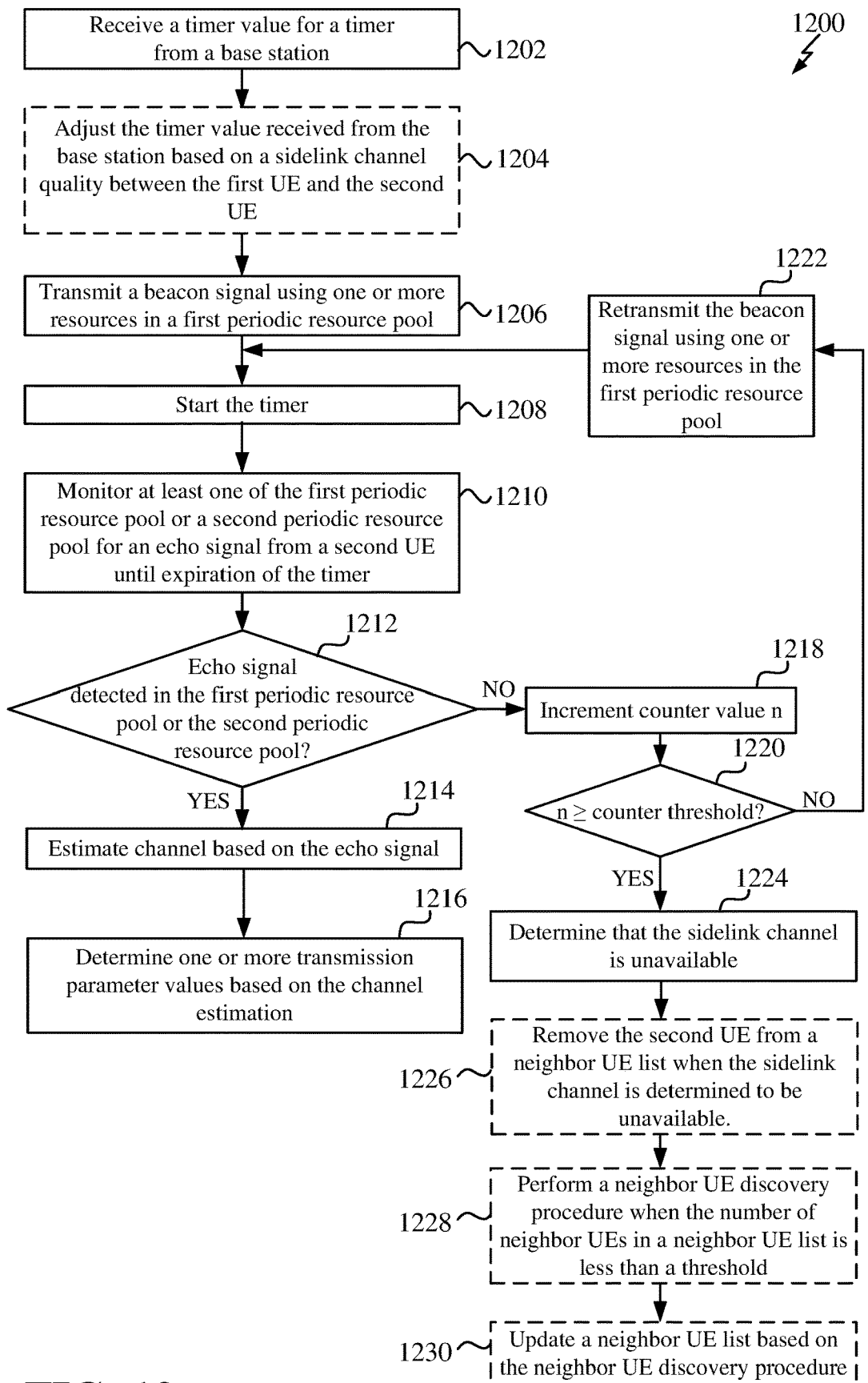
FIG. 12 is a flowchart of a method of wireless communication in accordance with various aspects of the disclosure.

FIG. 12 is a flowchart 1200 of a method of wireless communication. The method may be performed by a first UE (e.g., the UE 406; the apparatus 1302/1302'; the processing system 1414, which may include the memory 360 and which may be the entire UE 406 or a component of the UE 406, such as the TX processor 368, the RX processor 356, and/or the controller/processor 359). It should be understood that operations indicated with dashed lines in FIG. 12 represent optional operations.

At 1202, the first UE receives a timer value from a base station (e.g., the base station 402). In one example, the timer value may be a period of time, such as two seconds.

At 1204, the first UE optionally adjusts the timer value received from the base station based on a sidelink channel quality between the first UE (e.g., the UE 406) and the second UE (e.g., the UE 408). For example, the sidelink channel quality may be determined based on a signal strength measurement (e.g., a reference signal received power (RSRP)) of a reference signal or other suitable metric. In one example, if the sidelink channel quality is high (e.g., greater than a quality threshold), the UE 406 may reduce the timer value by a first percentage (e.g., 50%). In another example, if the sidelink channel quality is low (e.g., less than or equal to the quality threshold), the UE 406 may increase the timer value by a second percentage (e.g., 25%). In some examples, the first and second percentages may be the same. For example, the UE 406 may determine the sidelink channel quality between the UE 406 and the UE 408 during the discovery procedure 802.

At 1206, the first UE transmits a beacon signal using one or more resources in a first periodic resource pool. For example, with reference to FIG. 6, the first UE may select one or more resources to be used for transmission of a beacon signal from an instance of the reference signal resource pool 502. For example, the first UE may randomly select one or more resources included in the third instance of the reference signal resource pool 502 (e.g., at 502_3). As previously described, in some examples, the reference signal resource pool 502 may include one or more resource blocks. In these examples, the UE 406 may randomly select one or more of the resource blocks in the reference signal resource pool 502. The first UE may transmit a beacon signal, such as the beacon signal 812 in FIG. 8, using the selected one or more resources from an instance of the reference signal resource pool 502.

At 1208, the first UE starts the timer (e.g., at 814 in FIG. 8). For example, the first UE (e.g., the UE 406) may start the timer based on the timer value. In some examples, the first UE may start the timer upon transmission of the beacon signal 812.

At 1210, the first UE monitors at least one of the first periodic resource pool or a second periodic resource pool for an echo signal from the second UE (e.g., the UE 408) until expiration of the timer. For example, with reference to FIGS. 8 and 9, the first UE (e.g., the UE 406) may monitor 816 one or more periodic instances of the reference signal resource pool 502 and/or one or more periodic instances of the reference signal resource pool 503 for an echo signal from a second UE (e.g., the UE 408).

In one example, with reference to FIG. 9, if the first UE transmits the beacon signal 812 using one or more resources in the third instance of the reference signal resource pool 502 (e.g., at 502_3), the first UE may monitor the subsequent instances of the reference signal resource pool 502 at 502_4, 502_5, and 502_6 and/or the instances of the reference signal resource pool 503 at 503_3, 503_4, and 502_5 for an echo signal from the second UE (e.g., the UE 408) or other neighboring UEs.

For example, the first UE may monitor the reference signal resource pool 502 by measuring one or more periodic instances of the reference signal resource pool 502 to detect an echo signal from the second UE, and may monitor the reference signal resource pool 503 by measuring one or more periodic instances of the reference signal resource pool 503 to detect an echo signal from the second UE. In some examples, the first UE may stop monitoring the reference signal resource pool 502 and the reference signal resource pool 503 when the timer expires.

At 1212, the first UE determines whether the echo signal is detected in the first periodic resource pool or the second periodic resource pool. In one example, the first UE may detect the echo signal (e.g., a reference signal) in the first periodic resource pool if the first UE measures a signal strength above a detection threshold in an instance of the reference signal resource pool 502. In another example, the first UE may detect the echo signal in the second periodic resource pool if the first UE measures a signal strength above the detection threshold in an instance of the reference signal resource pool 503.

For example, the first UE may measure a signal strength by measuring a reference signal received power (RSRP) of an echo signal in an instance of the reference signal resource pool 502 or in an instance of the reference signal resource pool 503. For example, the first UE may not detect the echo signal in a periodic resource pool if the first UE measures a signal strength less than or equal to the detection threshold in an instance of the reference signal resource pool 502 or in an instance of the reference signal resource pool 503.

At 1214, the first UE estimates a sidelink channel (e.g., between the UE 406 and the UE 408) based on the echo signal. In one example, the echo signal may be a reference signal and the first UE may estimate a sidelink channel quality between the first UE and the second UE based on a signal strength measurement (e.g., a reference signal received power (RSRP)) of the reference signal. In other examples, a metric other than a signal strength measurement of the echo signal may be used to estimate the sidelink channel quality. In some examples, higher measured signal strengths of the echo signal may be associated with higher sidelink channel quality, while lower measured signal strengths of the echo signal may be associated with lower sidelink channel quality.

At 1216, the first UE determines one or more transmission parameter values based on the channel estimation. For example, the one or more transmission parameter values may include a resource block (RB) allocation, a modulation and coding scheme (MCS), a precoder to be applied, a rank, and/or other suitable transmission parameters.

At 1218, the first UE increments a counter value n (also referred to as a beacon attempt count value n) after the expiration of the timer if the first UE was unable to detect the echo signal in the periodic resource pool. At 1220, the first UE determines whether the counter value n is greater than or equal to a counter threshold.

At 1222, the first UE retransmits the beacon signal (e.g., the beacon signal 826 in FIG. 8) using the one or more resources in the first periodic resource pool if the counter value is less than the counter threshold. The first UE may restart the timer (e.g., at 1208) when the beacon signal is retransmitted (e.g., at 1222).

At 1224, the first UE determines that a sidelink channel is unavailable between the first UE and the second UE if the counter value n is greater than or equal to the counter threshold. At 1226, the first UE optionally removes the second UE from a neighbor UE list when the sidelink channel is determined to be unavailable. At 1228, the first UE optionally performs a neighbor discovery procedure when the sidelink channel is determined to be unavailable and when a number of neighbor UEs in a neighbor UE list is less than a threshold.

Finally, at 1230, the first UE optionally updates the neighbor UE list based on the neighbor discovery procedure. For example, the first UE may update the neighbor UE list by adding one or more newly discovered UEs to the neighbor UE list and/or by removing one or more UEs from the neighbor UE list.

Figure 13:
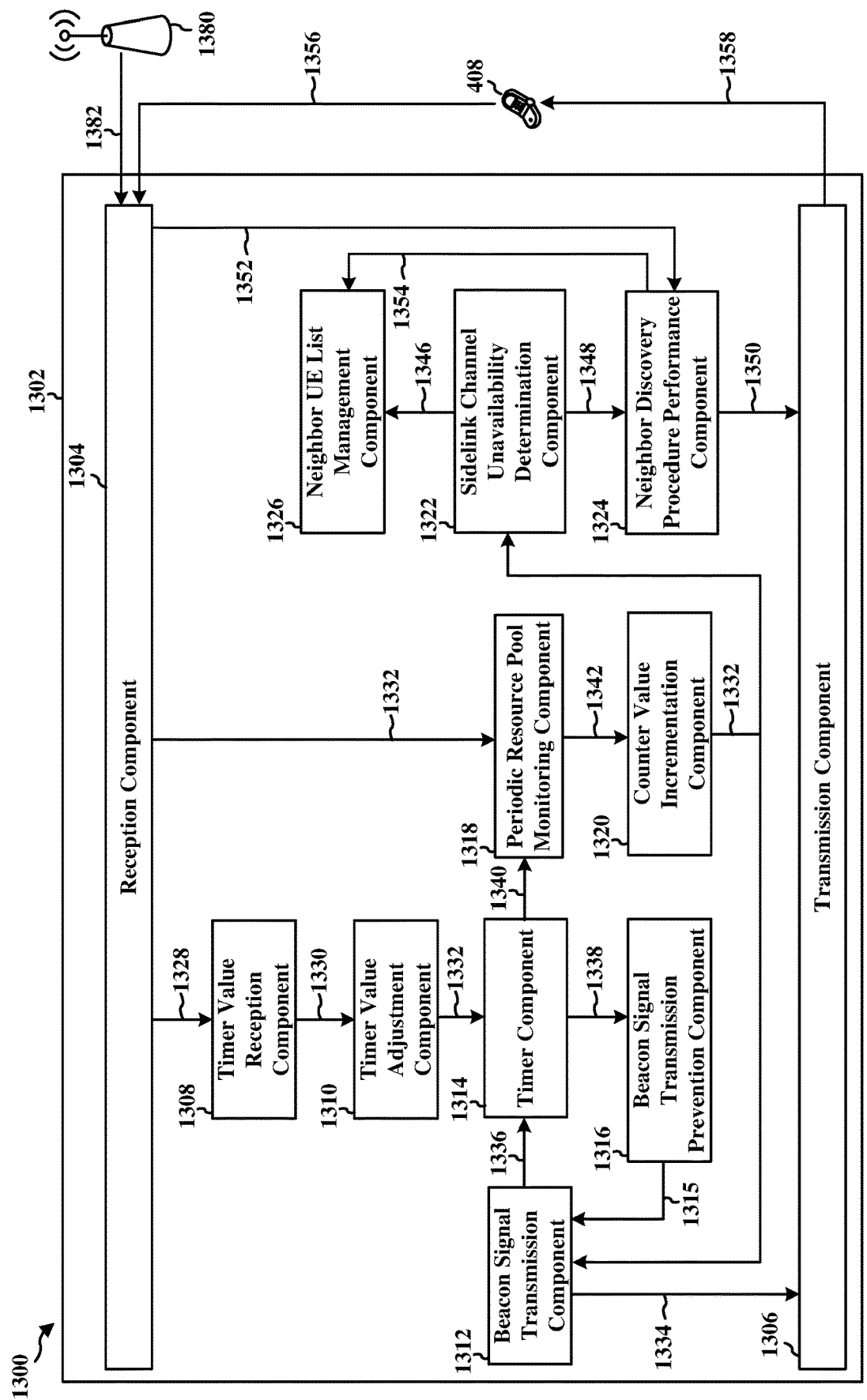
FIG. 13 is a conceptual data flow diagram illustrating the data flow between different means/components in an example apparatus.

FIG. 13 is a conceptual data flow diagram 1300 illustrating the data flow between different means/components in an example apparatus 1302. The apparatus may be a UE. The apparatus includes a reception component 1304 that receives downlink (DL) messages 1382 from the base station 1380. In some examples, the DL messages 1382 may include configuration information, such as a periodic resource pool allocation (e.g., as shown in FIG. 6), a timer value for a timer, a counter threshold associated with a beacon attempt count value, a threshold associated with a number of neighbor UEs that may be included in a neighbor UE list, and/or other suitable configuration information. The reception component 1304 further receives messages 1356 on a sidelink channel from the UE 408. For example, the messages 1356 may include a communication associated with a neighbor UE discovery procedure, an echo signal in response to a beacon signal, and/or other suitable messages.

The apparatus further includes a transmission component 1306 that transmits messages 1358 to the UE 408 on a sidelink channel. For example, the messages 1358 may include a beacon signal as described herein.

The apparatus further includes a timer value reception component 1308 that receives a timer value from the base station 1380. The apparatus further includes a timer value adjustment component 1310 that adjusts the timer value received from the base station based on a sidelink channel quality between the first UE and the second UE. In some aspects, the timer value adjustment component 1310 sets the timer (e.g., at the timer component 1314) with a timer value (e.g., the timer value received from the base station 1380 or an adjusted timer value). In some aspects, the timer value adjustment component 1310 may reset the timer to the determined timer value 1330 when the timer is restarted.

The apparatus further includes a beacon signal transmission component 1312 that transmits a beacon signal (e.g., via the transmission component 1306) using one or more resources in a periodic resource pool. The beacon signal transmission component 1312 may retransmit the beacon signal using the one or more resources in the periodic resource pool if the counter value is less than a counter threshold.

The apparatus further includes a timer component 1314 that may include a timer and may start the timer. For example, the timer component 1314 may receive a trigger signal 1336 from the beacon signal transmission component 1312 when a beacon signal is transmitted and may start the timer in response to the trigger signal 1336.

The apparatus further includes a beacon signal transmission prevention component 1316 that prevents transmission of any additional beacon signals when the timer is running. As shown in FIG. 13, the timer component 1314 may provide a timer signal 1338 to the beacon signal transmission prevention component 1316. The beacon signal transmission prevention component 1316 may output a signal 1315 to the beacon signal transmission component 1312 when the timer is running. The signal 1315 may prevent the beacon signal transmission component 1312 from transmitting a beacon signal.

The apparatus further includes a periodic resource pool monitoring component 1318 that monitors the periodic resource pool for an echo signal from the UE 408 until expiration of the timer and determines whether the echo signal is detected in the periodic resource pool. The periodic resource pool monitoring component 1318 may detect an expiration of the timer by receiving a timer expiration signal 1340 from the timer component 1314. In some examples, the periodic resource pool monitoring component 1318 monitors at least one of a first periodic resource pool or a second periodic resource pool for an echo signal from a second apparatus until expiration of the timer and determines whether the echo signal is detected in the first periodic resource pool or the second periodic resource pool.

The apparatus further includes a counter value incrementation component 1320 that increments a counter value after the expiration of the timer if the apparatus was unable to detect the echo signal in the periodic resource pool. For example, the periodic resource pool monitoring component 1318 may provide a signal 1342 to the counter value incrementation component 1320 indicating that the periodic resource pool monitoring component 1318 was unable to detect the echo signal in the periodic resource pool. The counter value incrementation component 1320 may transmit a signal 1332 indicating the counter value (e.g., the value of n) to the beacon signal transmission component 1312. In some aspects, the counter value incrementation component 1320 increments a counter value after the expiration of the timer if the first apparatus was unable to detect the echo signal in the first periodic resource pool or the second periodic resource pool.

The apparatus further includes a sidelink channel unavailability determination component 1322 that determines that a sidelink channel is unavailable between the apparatus and the UE 408 if the counter value is greater than or equal to a counter threshold. As shown in FIG. 13, the sidelink channel unavailability determination component 1322 may receive the signal 1332 indicating the counter value (e.g., the value of n).

The apparatus further includes a neighbor discovery procedure performance component 1324 that performs a neighbor discovery procedure (e.g., via sidelink communication signals 1350, 1352) when the sidelink channel is determined to be unavailable and when a number of neighbor UEs in a neighbor UE list is less than a threshold. The neighbor discovery procedure performance component 1324 may detect that the sidelink channel is determined to be unavailable via the signal 1348 from the sidelink channel unavailability determination component 1322.

The apparatus further includes a neighbor UE list management component 1326 that removes the second UE from a neighbor UE list when the sidelink channel is determined to be unavailable and updates the neighbor UE list based on the neighbor discovery procedure. The neighbor UE list management component 1326 may detect that the sidelink channel is determined to be unavailable via the signal 1346 from the sidelink channel unavailability determination component 1322. The neighbor UE list management component 1326 obtain the results 1354 of the neighbor discovery procedure to update the neighbor UE list.

The apparatus may include additional components that perform each of the blocks of the algorithm in the aforementioned flowcharts of FIGS. 10-12. As such, each block in the aforementioned flowcharts of FIGS. 10-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
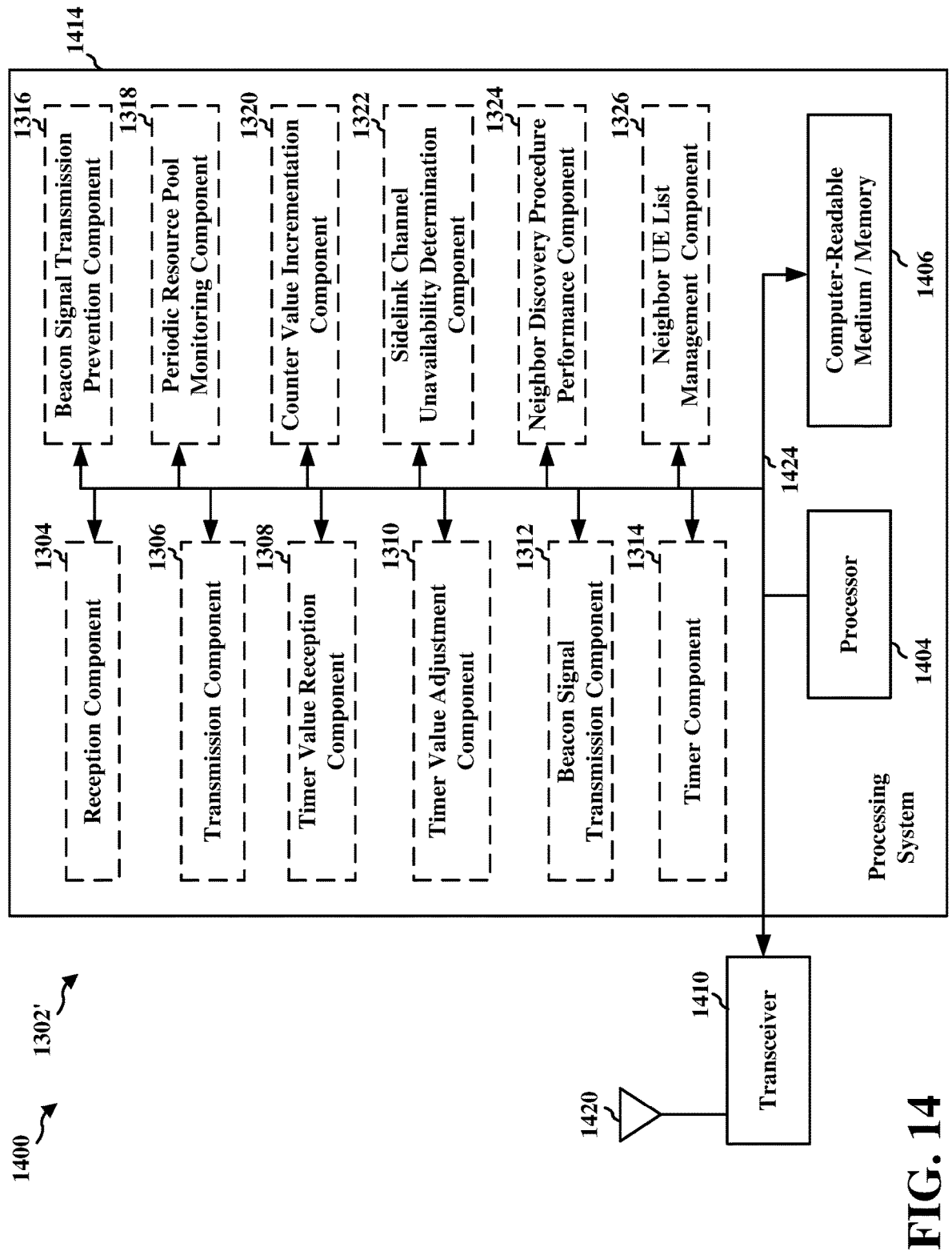
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318, 1320, 1322, 1324, 1326, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1204. In addition, the transceiver 1410 receives information from the processing system 1414, specifically the transmission component 1206, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318, 1320, 1322, 1324, 1326. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359. Alternatively, the processing system 1414 may be the entire UE (e.g., see 350 of FIG. 3).

In one configuration, the apparatus 1302/1302' for wireless communication (also herein referred to as the first apparatus 1302/1302') includes means for transmitting a beacon signal using one or more resources in a periodic resource pool, means for starting a timer, means for monitoring the periodic resource pool for an echo signal from a second apparatus until expiration of the timer, means for determining whether the echo signal is detected in the periodic resource pool, means for incrementing a counter value after the expiration of the timer if the first apparatus was unable to detect the echo signal in the periodic resource pool, means for retransmitting the beacon signal using the one or more resources in the periodic resource pool if the counter value is less than a counter threshold, means for restarting the timer when the beacon signal is retransmitted, means for determining that a sidelink channel is unavailable between the first apparatus and the second apparatus if the counter value is greater than or equal to a counter threshold, means for removing the second apparatus from a neighbor UE list (also referred to as a neighbor apparatus list) when the sidelink channel is determined to be unavailable, means for performing a neighbor discovery procedure when the sidelink channel is determined to be unavailable and when a number of neighbor UEs in a neighbor UE list is less than a threshold, means for updating the neighbor UE list based on the neighbor discovery procedure, means for preventing transmission of any additional beacon signals when the timer is running, means for receiving a timer value from a base station, and means for adjusting the timer value received from the base station based on a sidelink channel quality between the first apparatus and the second apparatus.

In some aspects, the means for monitoring the periodic resource pool for an echo signal from a second apparatus until expiration of the timer may be configured to monitor at least one of the first periodic resource pool or a second periodic resource pool for an echo signal from a second apparatus until expiration of the timer. In some aspects, the means for determining whether the echo signal is detected in the periodic resource pool is configured to determine whether the echo signal is detected in the first periodic resource pool or the second periodic resource pool. In some aspects, the means for incrementing a counter value after the expiration of the timer if the first apparatus was unable to detect the echo signal in the periodic resource pool is configured to increment the counter value after the expiration of the timer if the first apparatus was unable to detect the echo signal in the first periodic resource pool or the second periodic resource pool.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Since the UE 406 described herein starts a timer and monitors a periodic resource pool for an echo signal from the UE 408 until expiration of the timer, the UE 406 may avoid monitoring the periodic resource pool for an extended period of time in scenarios where an echo signal is not transmitted from the UE 408 (e.g., because the UE 408 missed a prior beacon signal) or where an echo signal from the UE 408 fails to reach the UE 406 (e.g., due to a physical obstruction or poor channel conditions as described with reference to FIG. 7). Accordingly, rather than continue to monitor the periodic resource pool for an echo signal that may ultimately not arrive at the UE 406, the UE 406 may retransmit the beacon signal after expiration of the timer and make another attempt to receive an echo signal. This may save time and resources at the UE 406 and improve performance. For example, the aspects described herein may reduce or avoid delays when the UE 406 needs to transmit sidelink data traffic to the UE 408 and is unable to detect an echo signal when monitoring the periodic resource pool.

FIG. 15 is a flowchart 1500 of a method of wireless communication. The method may be performed by a base station (e.g., the base station 402; the apparatus 1602/1602'; the processing system 1714, which may include the memory 376 and which may be the entire base station 402 or a component of the base station 402, such as the TX processor 316, the RX processor 370, and/or the controller/processor 375).

At 1502, the base station selects one or more parameter values for a beacon and echo procedure performed between first and second user equipments (UEs) using a periodic resource pool, the one or more parameter values including at least a time period for a timer implemented by the first UE when monitoring the periodic resource pool for an echo signal from the second UE. In some aspects, the one or more parameter values further includes a counter threshold, wherein the counter threshold is applied by the first UE to control a number of beacon signal transmission attempts at the first UE. In some aspects, the one or more parameter values further includes a neighbor UE list threshold representing a minimum number of neighbor UEs to be included in a neighbor UE list maintained at the first UE, wherein the neighbor UE list threshold is applied by the first UE when determining whether to perform a neighbor discovery procedure to update the neighbor UE list.

Finally, at 1504, the base station transmits the one or more parameter values to at least the first and second UEs (e.g., the UEs 406, 408).

Figure 16:
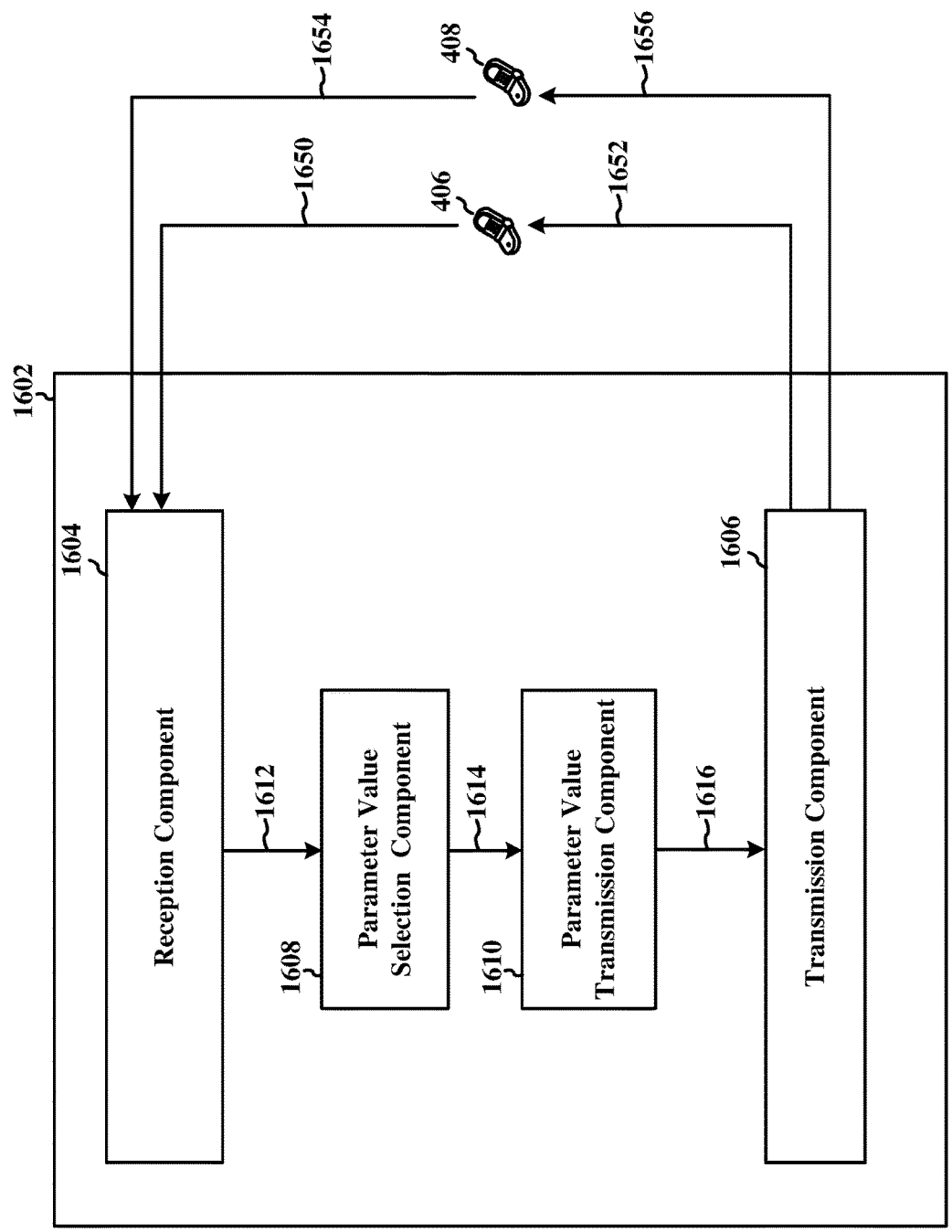
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a base station. The apparatus includes a reception component 1604 that receives uplink (UL) signals 1650, 1654 from at least first and second UEs (e.g., the UEs 406, 408). The apparatus further includes a transmission component 1606 that transmits downlink (DL) signals 1652, 1656 to at least the first and second UEs (e.g., the UEs 406, 408).

The apparatus further includes a parameter value selection component 1608 that selects one or more parameter values for a beacon and echo procedure performed between first and second user equipments (UEs) using a periodic resource pool, the one or more parameter values including at least a time period for a timer implemented by the first UE when monitoring the periodic resource pool for an echo signal from the second UE.

The apparatus further includes a parameter value transmission component 1610 that transmits the one or more parameter values to at least the first and second UEs.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
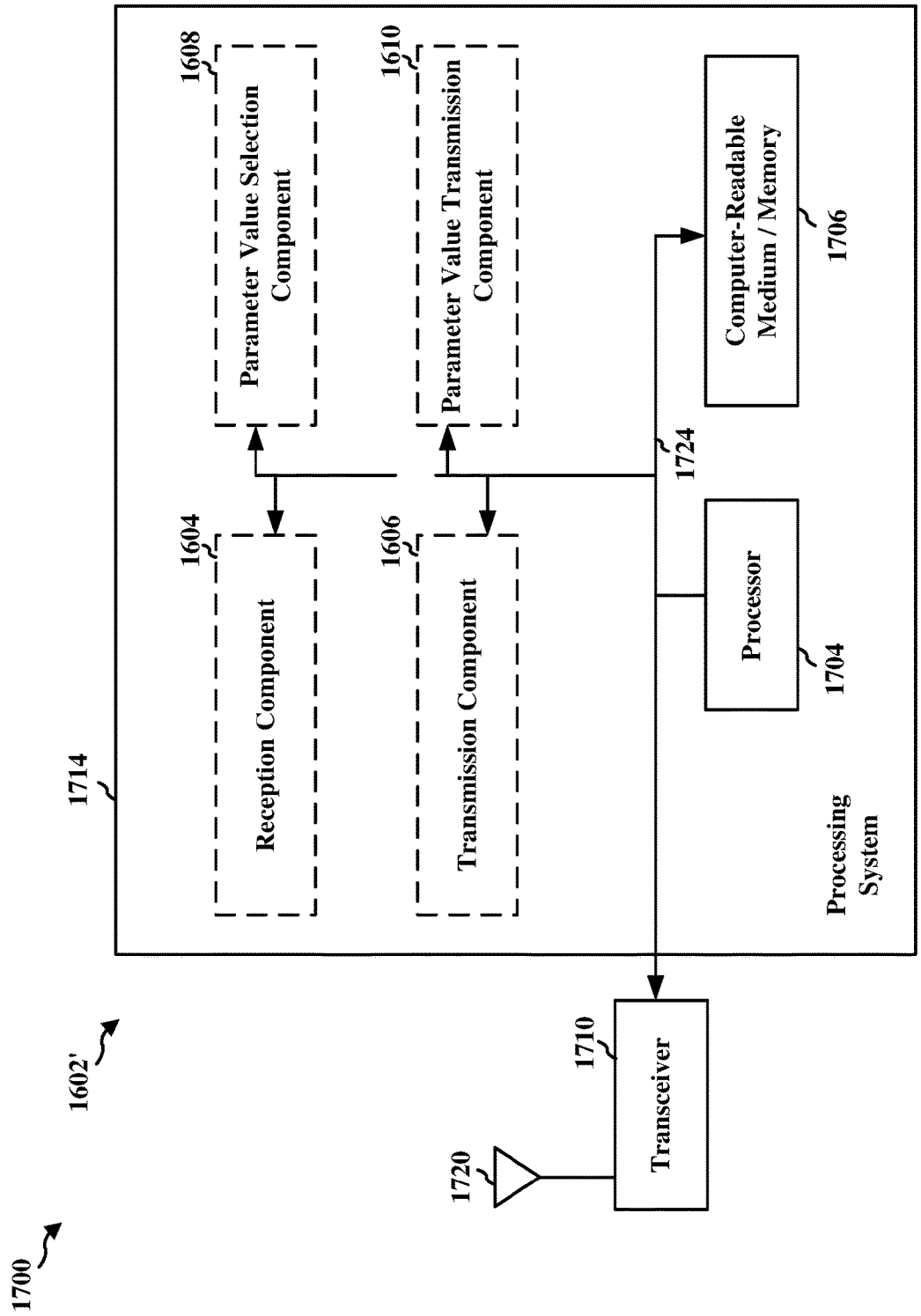
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610. The components may be software components running in the processor 1704, resident/stored in the computer readable medium/memory 1706, one or more hardware components coupled to the processor 1704, or some combination thereof. The processing system 1714 may be a component of the base station 310 and may include the memory 376 and/or at least one of the TX processor 316, the RX processor 370, and the controller/processor 375. Alternatively, the processing system 1714 may be the entire base station (e.g., see 310 of FIG. 3).

In one configuration, the apparatus 1602/1602' for wireless communication includes means for selecting one or more parameter values for a beacon and echo procedure performed between first and second user equipments (UEs) using a periodic resource pool, the one or more parameter values including at least a time period for a timer implemented by the first UE when monitoring the periodic resource pool for an echo signal from the second UE, and means for transmitting the one or more parameter values to at least the first and second UEs.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following provides an overview of aspects of the present disclosure:

Aspect 1: A method of wireless communication for a first user equipment (UE), comprising: transmitting a beacon signal using one or more resources in a periodic resource pool; starting a timer; and monitoring the periodic resource pool for an echo signal from a second UE until expiration of the timer.

Aspect 2: The method of aspect 1, further comprising: determining whether the echo signal is detected in the periodic resource pool; incrementing a counter value after the expiration of the timer if the first UE was unable to detect the echo signal in the periodic resource pool; and retransmitting the beacon signal using the one or more resources in the periodic resource pool if the counter value is less than a counter threshold.

Aspect 3: The method of aspect 1 or 2, further comprising: restarting the timer when the beacon signal is retransmitted.

Aspect 4: The method of any of aspects 1 through 3, further comprising: incrementing a counter value after the expiration of the timer if the first UE was unable to detect the echo signal in the periodic resource pool; and determining that a sidelink channel is unavailable between the first UE and the second UE if the counter value is greater than or equal to a counter threshold.

Aspect 5: The method of any of aspects 1 through 4, further comprising: removing the second UE from a neighbor UE list when the sidelink channel is determined to be unavailable.

Aspect 6: The method of any of aspects 1 through 5, further comprising: performing a neighbor discovery procedure when the sidelink channel is determined to be unavailable and when a number of neighbor UEs in a neighbor UE list is less than a threshold; and updating the neighbor UE list based on the neighbor discovery procedure.

Aspect 7: The method of any of aspects 1 through 6, wherein the first UE does not transmit any additional beacon signals when the timer is running.

Aspect 8: The method of any of aspects 1 through 7, further comprising: receiving a timer value from a base station; and adjusting the timer value received from the base station based on a sidelink channel quality between the first UE and the second UE.

Aspect 9: An apparatus for wireless communication, comprising: a memory; and at least one processor coupled to the memory and configured to perform a method of any one of aspects 1 through 8.

Aspect 10: An apparatus for wireless communication comprising at least one means for performing a method of any one of aspects 1 through 8.

Aspect 11: A computer-readable medium storing computer executable code, the code when executed by a processor cause the processor to perform a method of any one of aspects 1 through 8.

Aspect 12: A method of wireless communication for a first user equipment (UE), comprising: transmitting a beacon signal using one or more resources in a first periodic resource pool; starting a timer; and monitoring at least one of the first periodic resource pool or a second periodic resource pool for an echo signal from a second apparatus until expiration of the timer.

Aspect 13: The method of aspect 12, further comprising: determining whether the echo signal is detected in the first periodic resource pool or the second periodic resource pool; incrementing a counter value after the expiration of the timer if the first apparatus was unable to detect the echo signal in the first periodic resource pool or the second periodic resource pool; and retransmitting the beacon signal using the one or more resources in the first periodic resource pool if the counter value is less than a counter threshold.

Aspect 14: The method of aspect 12 or 13, further comprising: restarting the timer when the beacon signal is retransmitted.

Aspect 15: The method of any of aspects 12 through 14, further comprising: incrementing a counter value after the expiration of the timer if the first apparatus was unable to detect the echo signal in the first periodic resource pool or the second periodic resource pool; and determining that a sidelink channel is unavailable between the first apparatus and the second apparatus if the counter value is greater than or equal to a counter threshold.

Aspect 16: The method of any of aspects 12 through 15, further comprising: removing the second apparatus from a neighbor apparatus list when the sidelink channel is determined to be unavailable.

Aspect 17: The method of any of aspects 12 through 16, further comprising: performing a neighbor discovery procedure when the sidelink channel is determined to be unavailable and when a number of neighbor apparatuses in a neighbor apparatus list is less than a threshold; and updating the neighbor apparatus list based on the neighbor discovery procedure.

Aspect 18: The method of any of aspects 12 through 17, wherein the first apparatus does not transmit any additional beacon signals when the timer is running.

Aspect 19: The method of any of aspects 12 through 18, further comprising: receiving a timer value from a base station; and adjusting the timer value received from the base station based on a sidelink channel quality between the first apparatus and the second apparatus.

Aspect 20: An apparatus for wireless communication, comprising: a memory; and at least one processor coupled to the memory and configured to perform a method of any one of aspects 12 through 19.

Aspect 21: An apparatus for wireless communication comprising at least one means for performing a method of any one of aspects 12 through 19.

Aspect 22: A computer-readable medium storing computer executable code, the code when executed by a processor cause the processor to perform a method of any one of aspects 12 through 19.

Aspect 23: A method of wireless communication, comprising: selecting one or more parameter values for a beacon and echo procedure performed between first and second user equipments (UEs) using a periodic resource pool, the one or more parameter values including at least a time period for a timer implemented by the first UE when monitoring the periodic resource pool for an echo signal from the second UE; and transmitting the one or more parameter values to at least the first and second UEs.

Aspect 24: The method of aspect 23, wherein the one or more parameter values further includes a counter threshold, wherein the counter threshold is applied by the first UE to control a number of beacon signal transmission attempts at the first UE.

Aspect 25: The method of aspect 23 or 24, wherein the one or more parameter values further includes a neighbor UE list threshold representing a minimum number of neighbor UEs to be included in a neighbor UE list maintained at the first UE, wherein the neighbor UE list threshold is applied by the first UE when determining whether to perform a neighbor discovery procedure to update the neighbor UE list.

Aspect 26: An apparatus for wireless communication, comprising: a memory; and at least one processor coupled to the memory and configured to perform a method of any one of aspects 23 through 25.

Aspect 27: An apparatus for wireless communication comprising at least one means for performing a method of any one of aspects 23 through 25.

Aspect 28: A computer-readable medium storing computer executable code, the code when executed by a processor cause the processor to perform a method of any one of aspects 23 through 25.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A first apparatus for wireless communication, comprising:
    a memory; and
    at least one processor coupled to the memory, wherein the at least one processor is configured to:
        transmit a beacon signal using one or more resources in a periodic resource pool;
        start a timer; and
        monitor the periodic resource pool for an echo signal from a second apparatus until expiration of the timer, wherein the echo signal is a reference signal that enables the first apparatus to perform channel estimation to determine transmission parameters for communicating with the second apparatus.

2. The first apparatus of claim 1, wherein the at least one processor is further configured to:
    determine whether the echo signal is detected in the periodic resource pool;
    increment a counter value after the expiration of the timer if the first apparatus was unable to detect the echo signal in the periodic resource pool; and
    retransmit the beacon signal using the one or more resources in the periodic resource pool if the counter value is less than a counter threshold.

3. The first apparatus of claim 2, wherein the at least one processor is further configured to:
    restart the timer when the beacon signal is retransmitted.

4. The first apparatus of claim 1, wherein the at least one processor is further configured to:
    increment a counter value after the expiration of the timer if the first apparatus was unable to detect the echo signal in the periodic resource pool; and
    determine that a sidelink channel is unavailable between the first apparatus and the second apparatus if the counter value is greater than or equal to a counter threshold.

5. The first apparatus of claim 4, wherein the at least one processor is further configured to:
    remove the second apparatus from a neighbor apparatus list when the sidelink channel is determined to be unavailable.

6. The first apparatus of claim 4, wherein the at least one processor is further configured to:
    perform a neighbor discovery procedure when the sidelink channel is determined to be unavailable and when a number of neighbor apparatuses in a neighbor apparatus list is less than a threshold; and
    update the neighbor apparatus list based on the neighbor discovery procedure.

7. The first apparatus of claim 1, wherein the first apparatus does not transmit any additional beacon signals when the timer is running.

8. The first apparatus of claim 1, wherein the at least one processor is further configured to:
    receive a timer value from a base station; and
    adjust the timer value received from the base station based on a sidelink channel quality between the first apparatus and the second apparatus.

9. A method of wireless communication for a first user equipment (UE), comprising:
    transmitting a beacon signal using one or more resources in a periodic resource pool;
    starting a timer; and
    monitoring the periodic resource pool for an echo signal from a second UE until expiration of the timer, wherein the echo signal is a reference signal that enables the first UE to perform channel estimation to determine transmission parameters for communicating with the second UE.

10. The method of claim 9, further comprising:
    determining whether the echo signal is detected in the periodic resource pool;
    incrementing a counter value after the expiration of the timer if the first UE was unable to detect the echo signal in the periodic resource pool; and
    retransmitting the beacon signal using the one or more resources in the periodic resource pool if the counter value is less than a counter threshold.

11. The method of claim 10, further comprising:
    restarting the timer when the beacon signal is retransmitted.

12. The method of claim 9, further comprising:
    incrementing a counter value after the expiration of the timer if the first UE was unable to detect the echo signal in the periodic resource pool; and
    determining that a sidelink channel is unavailable between the first UE and the second UE if the counter value is greater than or equal to a counter threshold.

13. The method of claim 12, further comprising:
    removing the second UE from a neighbor UE list when the sidelink channel is determined to be unavailable.

14. The method of claim 12, further comprising:
    performing a neighbor discovery procedure when the sidelink channel is determined to be unavailable and when a number of neighbor UEs in a neighbor UE list is less than a threshold; and
    updating the neighbor UE list based on the neighbor discovery procedure.

15. The method of claim 9, wherein the first UE does not transmit any additional beacon signals when the timer is running.

16. The method of claim 9, further comprising:
    receiving a timer value from a base station; and
    adjusting the timer value received from the base station based on a sidelink channel quality between the first UE and the second UE.

17. A first apparatus for wireless communication, comprising:
    a memory; and
    at least one processor coupled to the memory, wherein the at least one processor is configured to:
        transmit a beacon signal using one or more resources in a first periodic resource pool;
        start a timer; and
        monitor at least one of the first periodic resource pool or a second periodic resource pool for an echo signal from a second apparatus until expiration of the timer, wherein the echo signal is a reference signal that enables the first apparatus to perform channel estimation to determine transmission parameters for communicating with the second apparatus.

18. The first apparatus of claim 17, wherein the at least one processor is further configured to:
  determine whether the echo signal is detected in the first periodic resource pool or the second periodic resource pool;
  increment a counter value after the expiration of the timer if the first apparatus was unable to detect the echo signal in the first periodic resource pool or the second periodic resource pool; and
  retransmit the beacon signal using the one or more resources in the first periodic resource pool if the counter value is less than a counter threshold.

19. The first apparatus of claim 18, wherein the at least one processor is further configured to:
  restart the timer when the beacon signal is retransmitted.

20. The first apparatus of claim 17, wherein the at least one processor is further configured to:
  increment a counter value after the expiration of the timer if the first apparatus was unable to detect the echo signal in the first periodic resource pool or the second periodic resource pool; and
  determine that a sidelink channel is unavailable between the first apparatus and the second apparatus if the counter value is greater than or equal to a counter threshold.

21. The first apparatus of claim 20, wherein the at least one processor is further configured to:
  remove the second apparatus from a neighbor apparatus list when the sidelink channel is determined to be unavailable.

22. The first apparatus of claim 20, wherein the at least one processor is further configured to:
  perform a neighbor discovery procedure when the sidelink channel is determined to be unavailable and when a number of neighbor apparatuses in a neighbor apparatus list is less than a threshold; and
  update the neighbor apparatus list based on the neighbor discovery procedure.

23. The first apparatus of claim 17, wherein the first apparatus does not transmit any additional beacon signals when the timer is running.

24. The first apparatus of claim 17, wherein the at least one processor is further configured to:
  receive a timer value from a base station; and
  adjust the timer value received from the base station based on a sidelink channel quality between the first apparatus and the second apparatus.

25. An apparatus for wireless communication, comprising:
  a memory; and
  at least one processor coupled to the memory, wherein the at least one processor is configured to:
    select one or more parameter values for a beacon and echo procedure performed between first and second user equipments (UEs) using a periodic resource pool, the one or more parameter values including at least a time period for a timer implemented by the first UE when monitoring the periodic resource pool for an echo signal from the second UE, wherein the echo signal is a reference signal that enables the first UE to perform channel estimation to determine transmission parameters for communicating with the second UE; and
    transmit the one or more parameter values to at least the first and second UEs.

26. The apparatus of claim 25, wherein the one or more parameter values further includes a counter threshold, wherein the counter threshold is applied by the first UE to control a number of beacon signal transmission attempts at the first UE.

27. The apparatus of claim 25, wherein the one or more parameter values further includes a neighbor UE list threshold representing a minimum number of neighbor UEs to be included in a neighbor UE list maintained at the first UE, wherein the neighbor UE list threshold is applied by the first UE when determining whether to perform a neighbor discovery procedure to update the neighbor UE list.

* * * * *